(12) United States Patent
Haraguchi et al.

(10) Patent No.: US 6,198,494 B1
(45) Date of Patent: Mar. 6, 2001

(54) IMAGE RECORDING APPARATUS WITH PLURAL PRINT HEADS

(75) Inventors: Tsuyoshi Haraguchi; Takashi Deguchi; Tuyosi Hattori; Takashi Igarashi, all of Tokyo (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/039,897

(22) Filed: Mar. 16, 1998

(30) Foreign Application Priority Data

Mar. 19, 1997 (JP) .................................................. 9-065861

(51) Int. Cl.[7] .................................................. B41C 1/04
(52) U.S. Cl. .......................... 347/232; 347/237; 358/302
(58) Field of Search .......................... 347/116–118, 129, 347/130, 19, 232, 234, 237; 358/1.2, 1.4, 1.8, 1.9, 302; 395/102, 104, 108, 109; 355/32, 37

(56) References Cited

U.S. PATENT DOCUMENTS 5,274,394 * 12/1993 Corona et al. ........................ 347/237
5,812,176 * 9/1998 Kawabe et al. .................. 347/237 X
6,035,076 * 3/2000 Nagase .............................. 347/116 X

* cited by examiner

Primary Examiner—Joan Pendegrass
(74) Attorney, Agent, or Firm—Frishauf, Holtz, Goodman, Langer & Chick, P.C.

(57) ABSTRACT

In a color image recording apparatus provided with plural print heads and a conveyor, each print head includes a plurality of recording elements aligned along at least a single line in a primary scanning direction and the plural print heads are arranged in parallel to each other in the primary scanning direction so that plural component images of the color image are formed parallel respectively by the plural print heads. A reference component image forming device controls the plural pieces of print heads so as to form and superimpose plural reference component images based on the reference component image data and timing setting values. A timing correcting unit analyzes positional deviations in the secondary scanning direction among the plural superimposed reference component images and corrects the timing setting values on the basis of the positional deviations in the secondary scanning direction.

23 Claims, 22 Drawing Sheets

DIRECTION OF RECORDING ADVANCE

TO DEVELOPING PROCESS

IMAGE RECORDING APPARATUS WITH PLURAL PRINT HEADS

BACKGROUND OF THE INVENTION

The present invention relates to an image recording apparatus in which recording is conducted by a plurality of paralleled print heads in each of which a plurality of light emitting elements are linearly aligned in the primary scanning direction.

Conventionally, as an apparatus in which an image is recorded with plural-time exposure for each pixel by the use of a print head equipped with an array-shaped light source in which light emitting elements are linearly aligned in a direction (the primary scanning direction) perpendicular to the conveying direction (the secondary scanning direction) of the photosensitive material used as an image recording medium, an apparatus provided with a LED array, a vacuum fluorescent indicating tube or a liquid crystal shutter array is known.

Further, as an apparatus in which recording is conducted by a non-exposure system such as a melting heat transfer system or a sublimating heat transfer system, a color image recording apparatus provided with a thermal print head in which heat generating elements are aligned in an array form is known.

Also, a color image recording apparatus using three print heads provided with three kinds of light emitting elements different in the wavelength of emitted light such as red, green and blue is known. In the color image recording apparatus, each of the three print head records an image one by one on the same line of pixels in order to obtain a color image. Further, in order to increase the recording speed, a method of using a plurality of the same kind of print head is known.

Incidentally, in the image recording apparatus provided with a plurality of print heads, it may be difficult to perfectly conform the actual image resolution of each print head to others. Even if the same kind of print heads are provided with the same image resolution, the distances among pixels in the primary scanning direction may become different among the print heads due to manufacturing errors of the print heads.

As a result, since the positions of the recorded image (pixel) in the primary scanning direction become different among the print heads, for example, color blur may take place on the edge portion of an image in the case that the image is recorded with multi-colors. As the worst case, color deviation in which the positions of images are deviated for each color may occur, resulting in that image quality may be degraded greatly.

Now, the color blur and the color deviation are explained more with reference to FIG. 11. In FIG. 11, the positions of print heads are adjusted such that color blur and color deviation do not take place at the position of address 0, thereafter exposure recording is conducted in the primary scanning direction with a given pixel interval by the print heads. At the position of address 767 in the vicinity of the center of the scanning line, color blur and color deviation take place, and at the position of address 2559 corresponding to the right edge, the positions of the recorded pixels are completely deviated from each other.

In a print head such as a vacuum fluorescent indicating tube in which a mask pattern of elements of a line is produced with the use of photo resist, errors in image resolution are small. In contrast, with a long print head in which a plurality of blocks each composed of 128 pieces of light emitting elements such as LED are combined, the above image degradation noticeably take place.

Further, in the case that an exposure section is constructed by a combination of different types of print heads such as a LED print head and a vacuum fluorescent print head, even if the different types of print heads are indicated with the same size such as 300 dpi (dot/inch), there may be errors in image resolution smaller than 1.0%. Color blur and color deviation may be caused by the errors smaller than 1.0% to an easily noticeable extent depending on the size of image.

Further, even in a monochromatic image, in order to reduce density irregularities by averaging dispersion in luminance among light emitting elements, or in order to make the life of a print head longer by reducing the light emission amount per a single print head, plural pieces of print heads are used so as to form an image with superimposed pixels. In this case, color blur and color deviation may be caused by deviation in the recorded positions of the superimposed pixels.

The deviation in the recording positions in the primary scanning direction is stated above. Also, the deviation in the recording positions in the secondary scanning direction is a problem as same as in the primary scanning direction. As a popular case as the deviation in the recording positions in the secondary scanning direction, the deviation may be caused in the case that the recording timing in the secondary scanning direction is not appropriately set for the relationship between the conveying speed of an image recording medium and the distance between print heads. In addition, in the case that the degree of parallelism between print heads is not satisfied with a predetermined level, or in the case that the print head is warped or curved, the deviations in the recording position in the secondary scanning direction are varied depending on the position in the primary scanning direction. Also, when the position of the first recording element on each print head is not parallel to the secondary scanning direction, color deviation, namely color deviation in the primary scanning direction, may occur.

In addition, depending upon the accuracy of the conveyance speed of the image recording medium, or the accuracy of the conveyance position in the primary scanning direction, an image may not be recorded at a desired position on the recording medium. In the case of prints with margins, prints having different margin amounts between laterally and longitudinally may occur. In addition, when a borderless print (which is a common print format in a silver halide print), it was problematic that unnecessary margins occur. Although it may be possible to increase the degree of precision in manufacturing and assembling so as to minimize the deviation in the recording positions in the primary scanning direction and in the secondary scanning direction as small as possible, increasing the degree of precision of machinery parts and lowering in assembling efficiency may raise the manufacturing cost. Further, even if the deviation in the recording positions is adjusted as small as possible at the time of shipment, it may be difficult to avoid deviations in recording position taking place due to the following causes: working environment such as temperature and humidity, deterioration due to transportation or long term usage, fluctuation due to wear or friction force down in driving system in the secondary direction, physical property change due to material change of a recording medium, position change due to assembling or disassembling at the time of print head replacement or at the time of removing the jammed recording medium.

SUMMARY OF THE INVENTION

In view of the above problems, the objective of the present invention is to provide an image recording apparatus with the structure capable of eliminating deviations in recording positions by the apparatus itself when an image is recorded by a plural pieces of recording heads, whereby high quality image can be secured for long term.

The above objective can be attained by either one of structures described in the following items.

Item 1. In an image recording apparatus comprising:
- a recording section in which plural pieces of print heads in each of which recording elements to record image data on an image recording medium are linearly aligned in plural lines are arranged in parallel to each other in the relative conveying direction of an image recording medium;
- control means to control the output toward the recording section on the basis of image data; and
- conveying means to convey the image recording medium in relationship to the print heads;
- the apparatus is characterized by comprising correction means to correct the image data in accordance with the difference between the standard image resolution and the image resolution of the print heads.

With the structure described in Item 1, by correcting the image data on the basis of the difference between the standard image resolution and the image resolution of the print heads, the apparent image resolution of each print head is conformed with the target image resolution, thereby reducing color blur in the recorded image and avoiding color deviation, deterioration in sharpness, and image-doubling. As a result, high grade visual image can be obtained.

Item 2. When the image resolution of the print head is higher than the standard image resolution, the image data is corrected so as to be enlarged in the aligning direction of the recording elements, while when the image resolution of the print head is lower than the standard image resolution, the image data is corrected so as to be reduces in the aligning direction of the recording elements.

With the structure described in Item 2, the image data is subject to enlarging or reducing process so as to conform the image resolution of the print head with that of the standard image resolution.

Item 3. One of the print heads in the recording section is the standard print head and the correction means corrects image data for the other print heads.

With the structure described in Item 3, since the correction for the image data is conducted based the difference between the image resolution of the standard print head and the image resolution of the other print heads, the positions of pixels being recorded are registered with a simple manner without measuring a true image resolution of each print head. Further, since the correction is conducted for the print heads other than the standard print head, the correction work for a single piece of the print head can be reduced in comparison with the correction to conform absolutely image resolutions with the standard one.

Item 4. The recording section is constructed by arranging a print head using LED and a vacuum fluorescent indicating tube are by plural pieces in parallel in the relative conveying direction of the image recording medium and the correction means uses the image resolution of the vacuum fluorescent indicating tube as the standard image resolution.

With the structure described in Item 4, by using the image resolution of the vacuum fluorescent indicating tube as the standard image resolution, errors in the image resolution can be refrained from occurring as far as possible and the image resolution can be conformed with the target image resolution.

Item 5. The print head is divided into several blocks in the aligned direction of the recording elements and the correction means corrects the image data in accordance with the difference between the image resolution of each block and the standard image resolution.

With the structure described in Item 5, since the deviation in distance between neighboring pixels at joint section of the recording element blocks is corrected for each recording element block, the positions of pixels being recorded are registered more precisely, thereby enhancing the correction effect.

Item 6. The correction means enlarges the image data in the aligning direction by adding specific pixels and reduces it by eliminating specific pixels.

With the structure described in Item 6, since the enlarging or reducing process for the image data is conducted by adding or eliminating pixels, the correction process for the image data can be conducted by a simple calculation without adding a new hard ware.

Item 7. In the elimination of the pixels, the position of the eliminated pixels are set to be different for each line of the image data in the aligning direction of the recording elements.

With the structure described in Item 7, since an event that pixels are eliminated at the same position can be avoided, the extent that image pattern is lost can be minimized, thereby refraining image quality from deteriorating.

Item 8. The apparatus is provided with image resolution measuring means to measure the image resolution of the print head.

With the structure described in Item 8, since the image resolution is measured with the image resolution measuring means, the correcting process can be conducted automatically without hands. For example, the position of the print head can be readjusted when the assembling machinery precision is changed due to heat change with time elapse or vibration.

Item 9. An image recording apparatus comprising:
- a recording section in which plural pieces of print heads in each of which a plurality of recording elements to record image data on an image recording medium are aligned in the primary scanning direction are arranged in parallel to each other;
- recording control means for controlling the recording section to conduct recording while the recording region of each print head is shifted in the secondary scanning direction relatively for the image recording medium so as to be superimposed on that of other print heads;
- recording timing control means for controlling the recording timing of each print head in the secondary scanning direction based on set values;
- recording timing setting value correcting means for correcting variably the setting values of the recording timing of at least one print head; and
- standard image forming means for forming a standard image on the image recording medium based on standard image forming data, wherein the recording position information of each print head in the secondary scanning direction is readable from the standard image; wherein the setting values of the recording timing are corrected so as to correct deviations in recording position of each print head on the image recording medium in the secondary scanning direction on the basis of the formed standard image.

With the structure described in Item 9, the recording position information of each print head in the secondary scanning direction is read from the standard image formed based on the standard image forming data, and the timing setting values of each print head in the secondary scanning direction are corrected among the print heads based on the recording position information, whereby deviations in recording position of each print head on the recording medium in the secondary scanning direction can be corrected so that image quality can be improved.

Item 10. An image recording apparatus comprising:
- a recording section in which plural pieces of print heads in each of which a plurality of recording elements to record image data on an image recording medium are aligned in the primary scanning direction are arranged in parallel to each other;
- recording control means for controlling the recording section to conduct recording while the recording region of each print head is shifted in the secondary scanning direction relatively for the image recording medium so as to be superimposed on that of other print heads;
- data-element relationship control means for correcting the relationship between the image data and the corresponding recording elements in the primary direction of the print head based on setting values;
- data-element relationship setting value correcting means for correcting variably the setting values of the data-element relationship of at least one print head; and
- standard image forming means for forming a standard image on the image recording medium based on standard image forming data, wherein the recording position information of each print head in the primary scanning direction is readable from the standard image;

wherein the setting values of the data-element relationship are corrected so as to correct deviations in recording position of each print head on the image recording medium in the primary scanning direction on the basis of the formed standard image.

With the structure described in Item 10, the recording position information of each print head in the primary scanning direction is read from the standard image formed based on the standard image forming data, and the setting values of each print head to determine the relationship between the image data and the corresponding recording element in the primary scanning direction are corrected among the print heads based on the recording position information, whereby deviations in recording position of each print head on the recording medium in the primary scanning direction can be corrected so that image quality can be improved.

Item 11. An image recording apparatus comprising:
- a recording section in which plural pieces of print heads in each of which a plurality of recording elements to record image data on an image recording medium are aligned in the primary scanning direction are arranged in parallel to each other;
- recording control means for controlling the recording section to conduct recording while the recording region of each print head is shifted in the secondary scanning direction relatively for the image recording medium so as to be superimposed on that of other print heads;
- recording timing control means for controlling the recording timing of each print head in the secondary scanning direction based on set values;
- recording timing setting value correcting means for correcting variably the setting values of the recording timing of at least one print head; and
- first standard image forming means for forming a first standard image on the image recording medium based on standard image forming data, wherein the recording position information of each print head in the secondary scanning direction is readable from the first standard image;
- data-element relationship control means for correcting the relationship between the image data and the corresponding recording elements in the primary direction of the print head based on setting values;
- data-element relationship setting value correcting means for correcting variably the setting values of the data-element relationship of at least one print head; and
- second standard image forming means for forming a second standard image on the image recording medium based on standard image forming data, wherein the recording position information of each print head in the primary scanning direction is readable from the second standard image;

wherein the setting values of the recording timing are corrected so as to correct deviations in recording position of each print head on the image recording medium in the secondary scanning direction on the basis of the formed first standard image, and the setting values of the data-element relationship are corrected so as to correct deviations in recording position of each print head on the image recording medium in the primary scanning direction on the basis of the formed second standard image.

With the structure described in Item 11, the recording position information of each print head in the secondary scanning direction is read from the first standard image formed based on the first standard image forming data, and the timing setting values of each print head in the secondary scanning direction are corrected among the print heads based on the recording position information, whereby deviations in recording position of each print head on the recording medium in the secondary scanning direction can be corrected, further the recording position information of each print head in the primary scanning direction is read from the second standard image formed based on the second standard image forming data, and the setting values of each print head to determine the relationship between the image data and the corresponding recording element in the primary scanning direction are corrected among the print heads based on the recording position information, whereby deviations in recording position of each print head on the recording medium in the primary scanning direction can be corrected, whereby image quality can be improved.

Item 12. The recording timing setting value correcting means corrects variably setting value independently for each element or for each of plural divided groups of recording elements for the print head whose recording timing setting values are changeable.

With the structure described in Item 12, even when a relative positional relationship among the print heads is not parallel to each other or even when the print head can not maintain its straightness and warp or curve takes place, the deviations in recording position can be reduced.

Item 13. The data-element relationship setting values are so corrected that each print head has a standard image resolution.

With the structure described in Item. 13, since the image resolution of each print head conforms with the standard image resolution, the deviations in recording position in the primary scanning direction among the print heads can be reduced, thereby reducing color blur in the recorded image and avoiding color deviation, deterioration in sharpness, and image-doubling. As a result, high grade visual image can be obtained.

Item 14. The standard image resolution is the image resolution of the standard print head which is either one of the plural pieces of print heads in the recording section and the data-element relationship setting values of the print heads other than the standard print head are corrected variably.

With the structure described in Item. 14, he image data is subject to enlarging or reducing process so as to conform the image resolution of the print head with that of the standard image resolution.

Item 15. The plural pieces of print heads comprises a LED print head and a vacuum fluorescent print head.

With the structure described in Item. 15, in the case that, for example, three colors of R, G, B print heads are used, the print heads can be appropriately selectively used such that the LED print head is used as the R print head, and the vacuum fluorescent print head which has relatively high luminance and high response and can divide colors easily with color filters is used as the G print head and the B print head.

Item 16. The image resolution of the vacuum fluorescent indicating tube is used as the standard image resolution and the setting value of the other print heads are corrected variably.

With the structure described in Item 16, by using the image resolution of the vacuum fluorescent indicating tube as the standard image resolution, errors in the image resolution can be refrained from occurring as far as possible and the image resolution can be conformed with the target image resolution.

Item 17. When the image resolution of the print head is higher than the standard image resolution, the data-element relationship setting values are corrected so as to be enlarged in the aligning direction of the recording elements, while when the image resolution of the print head is lower than the standard image resolution, the data-element relationship setting values are corrected so as to be reduces in the aligning direction of the recording elements.

With the structure described in Item 17, the image data is subject to enlarging or reducing process so as to conform the image resolution of the print head with that of the standard image resolution without adding a new hardware.

Item 18. The data-element relationship setting values are corrected by the number of pixels added into the image data for the correction in the enlarging direction of the image data and by the number of pixels eliminated from the image data for the correction in the reducing direction of the image data.
With the structure described in Item 18, since the enlarging or reducing process for the image data is conducted by adding or eliminating pixels, the correction process for the image data can be conducted by a simple calculation without adding a new hard ware.

Item 19. In the elimination of the pixels, the position of the eliminated pixels are set to be different for each line of the image data in the aligning direction of the recording elements.

With the structure described in Item 19, since an event that pixels are eliminated at the same position can be avoided, the extent that image pattern is lost can be minimized, thereby refraining image quality from deteriorating.

Item 20. The data-element relationship setting value is an enlarging ratio of image data for the correction in the enlarging direction of the image data or a reducing ratio of image data for the correction in the reducing direction of the image data.

With the structure described in Item 20, since the enlarging or reducing process for the image data is conducted by adding or eliminating pixels without adding a new hard ware such that pixel correction is conducted with an even rate for the entire image data, there is no influence due to addition or elimination of pixels and image quality can be improved as far as possible.

Item 21. The standard image forming data are written on the memory medium incorporated in the apparatus.

With the structure described in Item 21, the standard image can be formed only by the present image recording apparatus.

Item 22. Means for measuring the standard image is incorporated in the apparatus.

With the structure described in Item 22, the standard image is measured only by the present image recording apparatus so as to obtain the correction amount of the setting values, thereby conducting correction for the setting values.

Item 23. The recording section and recording medium holding section to hold a recording medium during recording are arranged so as to be relatively shiftable in a direction different from the secondary conveying direction.

With the structure described in Item 23, even when the image recording medium is jammed and is unable to move relatively to the recording section, restoration can be easily conducted, and deviations in recording position caused by the restoration can be easily rapidly corrected, whereby high quality image can be provided stably.

Item 24. The print heads are arranged to be replaceable.

With the structure described in Item 24, when the print heads are replaced due to deterioration, deviations in recording position can be easily rapidly corrected, whereby high quality image can be provided stably.

Item 25. The standard print head is a print head being unable to be replaced.

With the structure described in Item 25, the setting values of only the replaceable print heads may be adjusted based on the print head being unable to be replaced.

Item 26. The plural pieces of print heads are integrated in a single body.

With the structure described in Item 26, the print heads can be shipped as a unit. Further, in the case that the print heads are incorporated in the actual machine, deviations in recording position caused by slight difference in relative moving speed between the unit inspecting machine in the factory and the actual machine due to wear on the conveying section can be easily rapidly corrected, whereby high quality image can be provided stably.

Item 27. Correction for the data-element relationship setting values are conducted based on a specific print head for only the other print heads.

With the structure described in Item 27, since it is not necessary to adjust the setting values and it is enough to adjust only the other print heads, the adjustment time can be shortened efficiently.

Item 28. Each print head conducts exposure recording with light having different wavelength from others.

With the structure described in Item 28, in comparison with pixel deviation reduction in the case of conducting the same color exposure recording by plural print heads, great effect to reduce color deviation can be obtained.

Item 29. The print heads comprises print heads for blue light recording, green light recording and red light recording.

With the structure described in Item 29, color deviations in the case that exposure recording is conducted with ordinary R, G, B primary three colors can be reduced efficiently.

Item 30. The standard image is used to the image recording by at least two pieces of print heads.

With the structure described in Item 30, the relative positional relationship among print heads is clarified, whereby recording deviations can be actually reduced. In particular, in color recording, since different colors are indicated for each print head, distinction becomes clear.

Item 31. All of the standard images necessary for the correction are formed on a single sheet of the image recording medium.

With the structure described in Item 31, the recording position deviations can be grasped at a glance.

Item 32. The standard images are formed in the smallest size capable of being formed by the image recording apparatus.

With the structure described in Item 25, since an area used for recording the standard image which is not used for an actual image recording is made smallest, the loss of the image recording medium can be minimized.

Item 33. The timing setting values includes a first timing setting value to adjust a recording deviation between a print head and the other print head and a second timing setting value to adjust the recording position of an image on the recording medium and the timing correcting means corrects the first timing setting value and the second timing setting value based on the reference component images.

Item 34. The arrangement setting values includes a first arrangement setting value to adjust a recording deviation between a print head and the other print head and a second arrangement setting value to adjust the recording position of an image on the recording medium and the arrangement correcting means corrects the first arrangement setting value and the second arrangement setting value based on the reference component images.

With the structure described in Items 33 and 34, In the case of adjusting the recording deviation and the color deviation, in particular, in the case of forming a no edge-frame print or a borderless print which is popular in the photographic print, when only the image recording position is to be adjusted in order to avoid unnecessary white margin, the first timing setting value, the second timing setting value, the first arrangement setting value and the second arrangement setting value can be adjusted independently, whereby the adjustment can be attained simply.

BRIEF DESCRIPTION OF DRAWINGS

FIG. 21 is a drawing showing still another example of a standard image for adjusting exposure timing in the secondary scanning direction.

DETAILED DESCRIPTION OF THE PREFERRED EMBODIMENT

Hereinafter, embodiment of the present invention will be explained referring to FIGS. 1 through 26.

Figure 1:
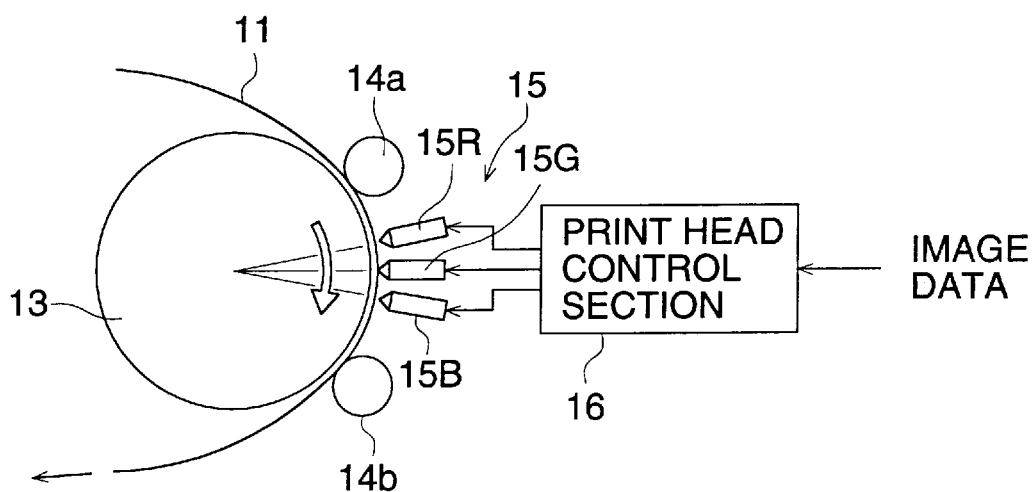
FIG. 1 a side view of a recording section of an image recording apparatus.
Figure 2:
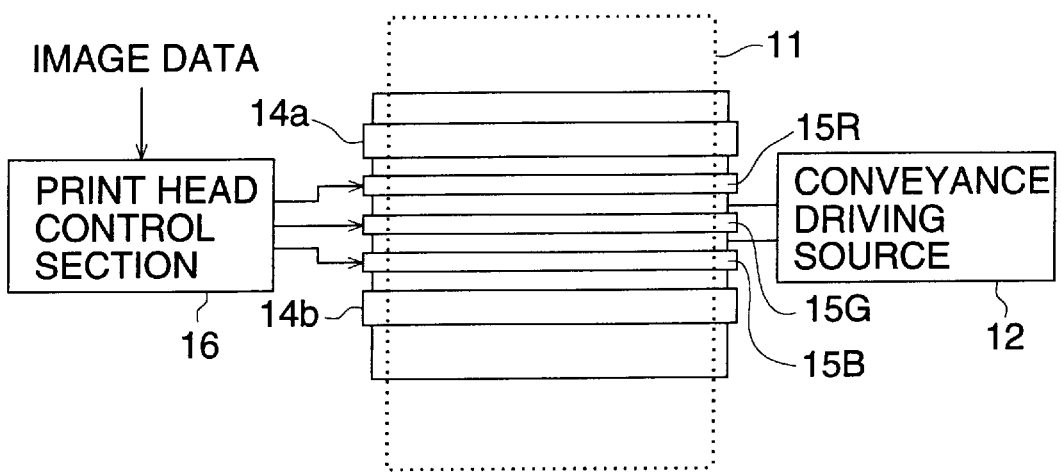
FIG. 2 is a front view showing schematic structure of the recording section in the image recording apparatus.

First, FIGS. 1 and 2 show schematic structures of a recording section of an image recording apparatus common to each embodiment. FIG. 1 shows a side view of a recording section. FIG. 2 shows a front view.

Color photographic paper 11 is conveyed in an arrowed direction in FIG. 1 due to the rotation of supporting drum 13, while aforesaid color photographic paper is supported by supporting drum 13 which is actuated to be rotated by conveyance driving source 12 such as a motor and pressure roller 14a. On the other hand, due to controlling exposure section 15 in which print head 15R for R (red), print head 15G for G (green) and print head 15B for B (blue) in this order from the upstream side of aforesaid conveyance by means of print head controlling section 16, image data inputted to aforesaid print head controlling section 16 is exposed and recorded on color photographic paper 11.

Figure 3:
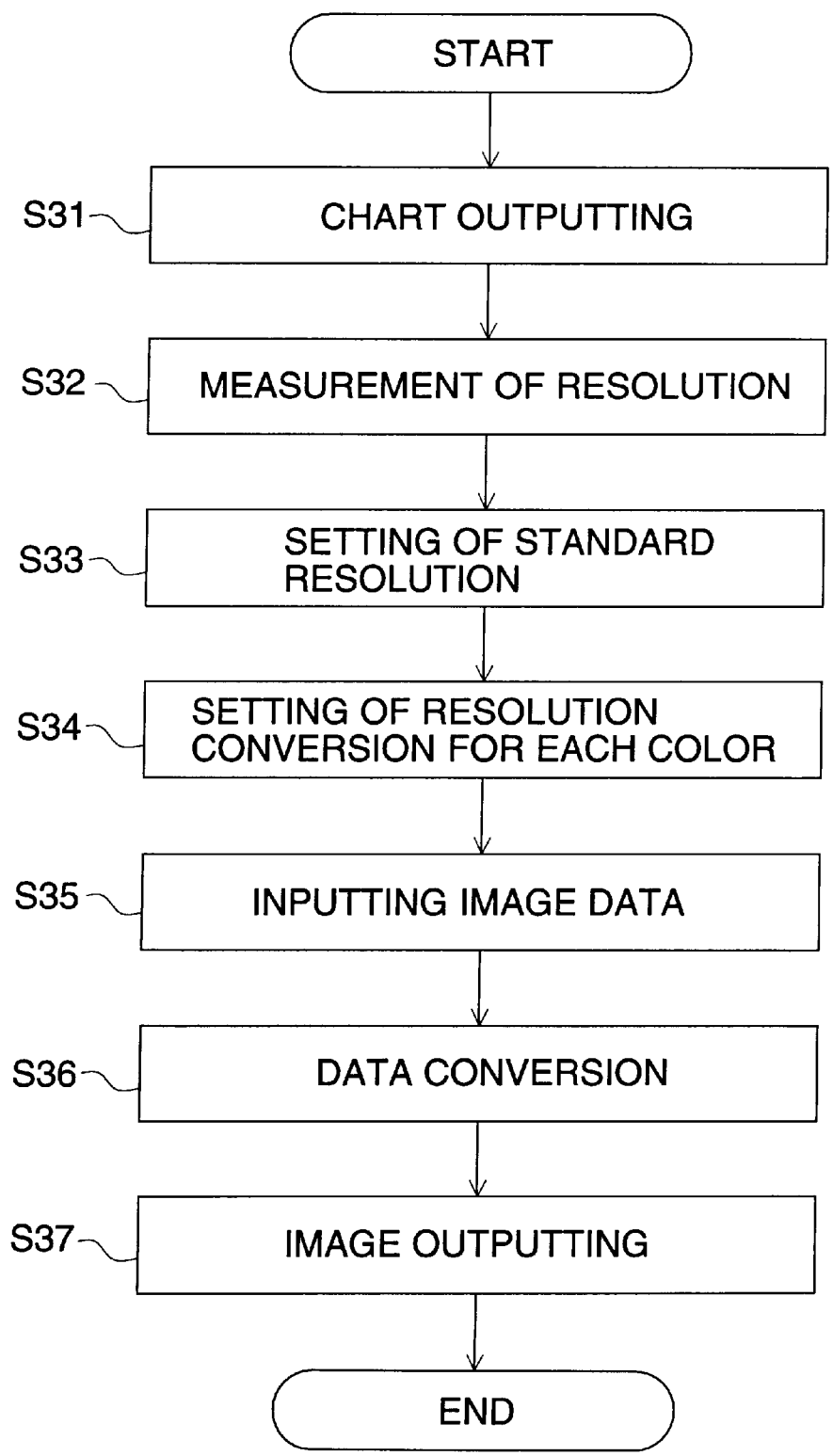
FIG. 3 shows a flow chart of exposure recording processing of image data.

One example of aforesaid processing flow will be explained simply using a flow chart exhibited in FIG. 3. First, to each of the above-mentioned print head 15R, 15G and 15B, chart for resolution measuring (described later) is outputted (Step 31, hereinafter abbreviated as S31) so that resolution for each print head is measured (S32). Here, measurement of resolution may be that of absolute resolution or that of the difference of resolution for each head.

Next, in order to coincide the resolution of each print head 15R, 15G and 15B, targeted resolution is set (S33), and then, a conversion method of resolution for each print head (for each color) is set (S34). Thus, after setting up resolution conversion of an image recording apparatus, image data is inputted by means of an ambient device such as a personal computer (S35). By the use of a CPU of an image processing circuit in a recording apparatus, resolution conversion processing is conducted (S36). An image is outputted on color photographic paper 11 while there is no shift in pixel position (S37). Incidentally, resolution conversion processing may be conducted prior to S35 or in parallel with S35.

Next, practical structure of exposure section 15 will be explained.

In the present embodiment, print head 15R for R color employs an LED print head in which the central wavelength of light emitting of 660 nm, resolution of 300 dpi and pixel number of 2560. Print heads 15G for G color and 15R for R color respectively employ vacuum fluorescent print head (VFPH) which can separate colors easily by means of color filters at relatively high illuminance end high speed response.

A yellow filter and a blue filter are respectively added to the beam path in print head 15G for G color and print head 15B for B color so that Konica color QA paper type A6 (used as color photographic paper 11, produced by Konica Corporation) is subjected to color separation exposure. Incidentally, it goes without saying that pixel numbers of print head 15G for G color and that of print head 15R for R color and resolution of print head 15G for G color and that of print head 15R for R color are respectively the same as print head 15R for R colon However, since with regard to actual resolution, as described above, error for print head may occur, the present invention overcomes it.

Next, processing since image data is inputted to print head control section 16 until it is exposed onto color photographic paper 11 will be explained.

Figure 4:
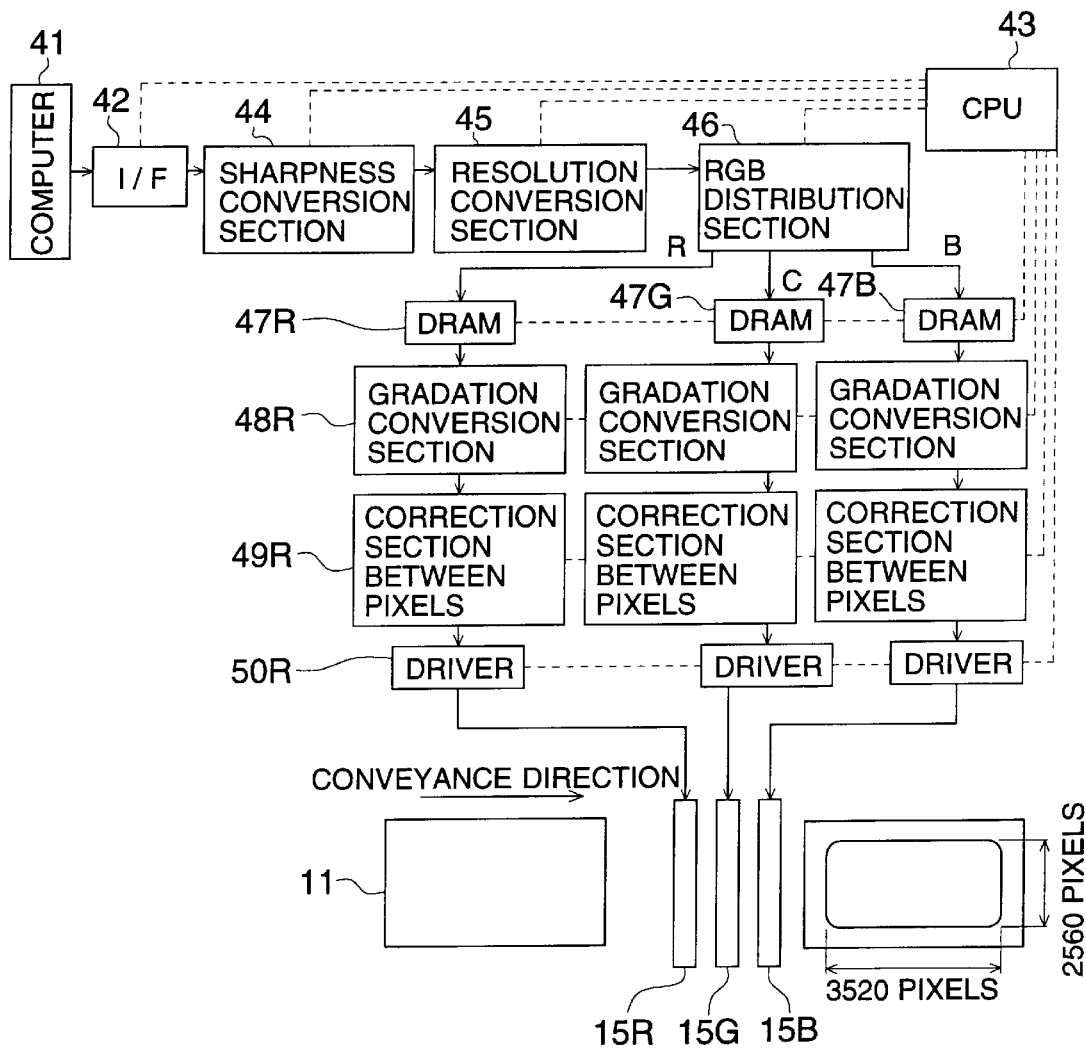
FIG. 4 is a drawing showing structure of a print head control section.

FIG. 4 is a drawing showing practical structure of print head control section 16. When image data having 2560 pixels in the primary scanning direction and 3520 pixels in the conveyance direction (secondary scanning direction) is recorded on color photographic paper 11, image data for 2560×3520 pixels is inputted into SCSI-II SCSI: Small Computer System Interface) capable of communicating at high speed for each color from computer 41. From I/F 42, in addition to image data, correction values and conversion coefficients such as sharpness conversion, resolution-conversion, correction between pixels and gradation conversion and data about print head interval are inputted into CPU 43. In this instance, image data is inputted from I/F 42, and the following processing is conducted in succession.

Based on setting by CPU 43, as necessary, sharpness conversion coefficient is sent to sharpness conversion section 44 from CPU 43 so that sharpness is converted. In aforesaid sharpness conversion, sharpness of image is converted by stressing or flattening contours, in which a 5×5 or 3×3 pixels convolution filters are changed to be used on image data sent one by one for each color.

Successively, in resolution conversion section 45, resolution of image data after the sharpness is converted based on setting by CPU 43. Aforesaid image data is separated to each color gradient of R, G and B by means of RGB date distribution section 46. Each color gradient is stored in DRAM 47R, 47G and 47B.

Here, for simplifying explanation, processing of R color gradient is exemplified to be explained. Among R gradient image data stored in DRAM 47R, image data corresponding to one line in the primary scanning direction is taken out of DRAM 47R and image data of aforesaid one line is outputted to gradation conversion section 48R.

After the gradation of image data of aforesaid one line inputted to aforesaid gradation conversion section 48R is converted based on setting by CPU 43, aforesaid image data is inputted to correction section 49R between pixels. In aforesaid conversion section 49R, inputted image data is modified based on setting by CPU 43 in such a manner that the inputted image data has the targeted gradation properties.

In correction section 49R between pixels, correction between pixels (described later) is conducted. An image outputting signal is supplied to driver 50R which supplies an image outputting signal to a print head, and color photographic paper 11, which is an image recording medium, is exposed.

The above-mentioned processing is conducted to G gradient and B gradient image data too in parallel, so that color photographic paper is subjected to exposure. By photographic processing exposed color photographic paper 11, visualized image of image data can be obtained.

However, since, in FIG. 2, the mounting position of each of print heads 15R, 15G and 15B cannot be coincided each other in the secondary scanning direction, they are mounted with interval. Namely, in FIG. 1, after a color photographic paper is exposed for recording by means of print head 15R for R color and until aforesaid color photographic paper 11 is exposed for recording by print head 15G for G color, there exists conveyance time difference which depends on conveyance speed and mounting interval in the secondary scanning direction between print head 15R for R color print head 15g for G color or pixel difference in the secondary scanning direction. Accordingly, it is necessary to coincide pixels recorded in color photographic paper 11 in the secondary scanning direction.

Therefore, head interval in the secondary scanning direction between print head 15R for R color and print head 15G for G color and between print head 15G for G color and print head 15B for B color were measured in advance. Based on aforesaid head intervals measured, data "0" (actually, data which does not cause emitting print head) is not caused to each recording pixel on print head 15G for G color since print head 15R for R color starts exposure on color photographic paper 11 until aforesaid exposure starting position is conveyed to the exposure starting position of print head 15G for G colon Due to this, the position of pixel in the secondary scanning direction recorded onto color photographic paper 11 can be corrected.

In the same manner, the difference in the secondary scanning direction of print head 15B for b color is corrected based on interval with print head 15G for g color measured.

Incidentally, among image data of print head 15R for R color, for a period after outputting the final primary scanning line until being conveyed to the position of print head 15G for G color, it is controlled that data "0" is continued to be outputted until conveyance is finished without stopping outputting print head 15G for G colon This is because that, in the case of after outputting image data by print head 15G for G color, mechanism is more simplified when each print head is synchronously operated. It is not necessary for the print head in which data "0" is being sent to operate during sending time. Driving may be stopped.

Next, correction between pixels is explained.

In the print head in which plural of the above-mentioned recording elements are aligned linearly, there may be cases in which the properties of emission amount on the inputted signal of each recording element (pixel) are different. Specifically, when an image is exposed for recording on a recording medium such as a color photographic paper in which continuous gradation can tee reproduced, density unevenness in accordance with the difference of emission amount occurs on the recording medium due to aforesaid property difference, causing image quality remarkably. In order to unify property of emission amount of each recording element, it is necessary to correct image data. Aforesaid correction processing is correction between pixels.

Figure 5:
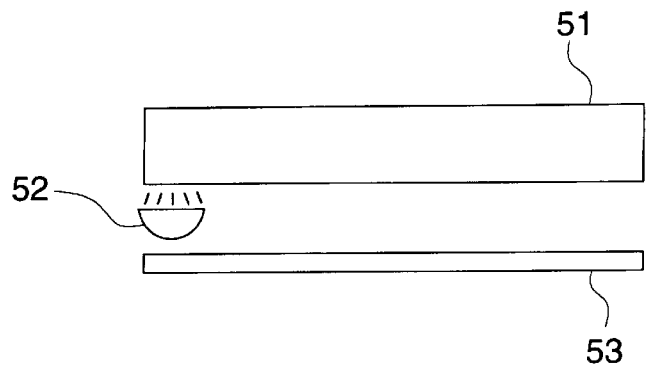
FIG. 5 is a drawing explaining a method of correction between pixels.

Practically, as shown in FIG. 5, beam receiving sensor 52 is provided on beam receiving side of print head 51 so that position of beam receiving sensor 52 is shifted by sensor movement table 53 in such a manner that it becomes rightly below the recording element which wants to measure beam by print head 51. Beam receiving sensor 52 receives beam from each of recording element on print head 51. The strength of irradiated beam is converted to voltage by means of a photo-converter located inside for A/D conversion, and then aforesaid strength is outputted to CPU 43.

When emission amount of each recording element is calculated as described above, as properties of beam receiving sensor 52, it is preferable that the property of outputted voltage on entering beam amount has a linear relationship. Even when the voltage is outputted un-linearly too, by measuring voltage properties on the entering beam amount in advance, absolute beam amount can be known.

In the present embodiment, as a beam receiving sensor, abeam receiving sensor such as a photo-multiplier in which outputting on entering beam amount has a linear relationship. In CPU 43, when a voltage value is inputted from a beam receiving sensor, it is divided by the standard voltage for forming a correction value between pixels. Aforesaid correction value between pixels corrects dispersion of beam emission amount of each recording element by multiplying with image data when aforesaid image data is inputted to each print head 15R, 15G and 15B. After preparing aforesaid correction value between pixels, each print head is fixed against supporting drum 13 as shown in FIG. 1.

Incidentally, supporting drum 13 is formed by a transparent material. Inside aforesaid transparent supporting drum, a beam receiving sensor is provided for measuring beam at an appropriate frequency. Thereby, correction data may be prepared.

Next, a measurement method of resolution in the primary scanning direction is explained.

It is preferable that resolution of each print head is ideally targeted resolution. However, practically, since resolution is different for each print head, the position of image recorded must be aligned by processing images (magnifying/reducing image data in the primary scanning direction).

Aforesaid magnifying/reducing processing includes addition/removal processing of specific pixels, in addition to uniformly magnifying initial image data.

The minimum requirements for setting resolution include that resolution of each print head approximately relatively coincide. An objective is attained by removing shift of pixel position.

The measurement method of resolution in terms of an absolute value not of a relative value is, as shown in FIG. 6(a), is conducted based on outputting results of a chart pattern in which 256 pixels of blank is repeated to be inserted after recording one pixel. In FIG. 6(a), recording is conducted every 256 pixels of intervals. However, any intervals are allowed provided that a light emission diode does not receive influence from light of a diode which emits at the closest position (detection accuracy of the peak position described later is improved). In addition, with regard to the number of light emission diode, if several elements containing both ends within an effective printing width are emitted for recording, resolution measurement having favorable accuracy can be conducted on print heads in which the position of each element is intrinsically shifted.

Practically, with intervals as shown in FIG. 6(a), recording signals for R color, G color and B color are transferred onto each print head 15R, 15G and 15B for recording signals on a color photographic paper. On a color photographic paper, cyan is colored on R, magenta is colored on G and yellow is colored on B so that a chart pattern for each color is formed.

The density value of aforesaid chart pattern is read for each color with intervals thinner then pixel pitch by 5 times (for example, 5 $\mu$m) in the primary scanning direction by the use of a micro-densitometer, and then the central position of the peak of the resulting density value (peak position) is calculated. FIG. 6(b) shows en example of the results. Here, in order to obtain effective printing width w of print head, recording starting position of the chart pattern is determined to be "address 0", and recording finishing position is determined to be "address 2559". Thereby, peak position 61 of the density value at "address 0" and peak position 62 of the density value at "address 2559" are determined. Between address 0 and address 2559 is defined to be "effective printing width w". In order to obtain sufficient accuracy, aforesaid effective numeral w is set in such a manner that measurement error of w on the distance be 0.1% or less. The effect of the present invention becomes prominent in a print head whose w is 100 mm or more. Incidentally, if the chart pattern is used only for calculating effective printing width w of the print head, it is allowed that only lines are outputted at the positions of addresses "0" and "2559" in FIG. 6(a).

From effective printing width w (mm), actual resolution D in the primary scanning direction is calculated. Here, provided that resolution D has dpi unit system, resolution D can be represented by $$\text{Resolution } D = 2560/w \times 25.4 \tag{1}$$

Aforesaid resolution can be calculated for each of print head, and used in an equation (5) described later.

Next, the first embodiment in which the difference of resolution at both ends of the print head is measured and the image data is corrected in order to minimize the difference between actual resolution and targeted resolution, for example, nominal resolution (300.0 dpi if in the case of a print head for 300 dpi outputting).

As a method of correcting the difference between the actual resolution and the targeted resolution, there is a method of correcting apparent resolution of the print head by magnifying/reducing image data in the primary scanning direction.

Ordinarily, a bi-linear method, a linear interpolation method in accordance with equation (2) described later and a cubic-convolution method in accordance with equation (3). Algorithm used in magnifying/reducing an image can be utilized as it is.

$$P = \{(a_2 \times P_1) + (a_1 \times P_2)\}/(a_1 + a_2) \tag{2}$$

$$P = \frac{1}{\sum_{i=1}^{4} f(x_i)} (P_1 P_2 P_3 P_4) \begin{pmatrix} f(x_1) \\ f(x_2) \\ f(x_3) \\ f(x_4) \end{pmatrix} \quad (3)$$

Figure 12:
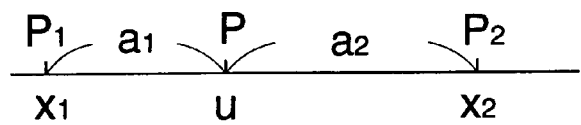
FIG. 12 is a drawing explaining how to calculate an image signal at an interpolated position by a linear interpolation method.
Figure 13:
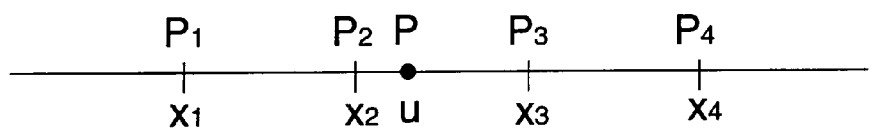
FIG. 13 is a drawing explaining how to calculate an image signal at an interpolated position by a cubic-convolution method.

$X_1 = 1 + (u - [u])$ $X_2 = u - [u]$ $X_3 = 1 - (u - [u])$ $X_4 = 2 - (u - [u])$ $f(t) = \sin \pi t / \pi t$ In the case of linear interpolation, as shown in FIG. 12, image signal Pat interpolation point u in equation (2) is a internal separation point of image signals $P_1$ and $P_2$ of the front and rear points $x_1$ and $x_2$. $a_1$ represents length between P and $P_1$, and $a_2$ represents length between P and $P_2$. In addition, in equation (3), image signal Pat interpolation point u is calculated from, as shown by FIG. 13, image signals $P_1$, $P_2$, $P_3$ and $P_4$ respectively at addresses of $x_1$, $x_2$, $x_3$ and $x_4$. Here, $x_1$, $X_2$, $x_3$ and $x_4$ represent integers. "u" represents a real number. [u] is a rounded value of u.

Among above correction methods, a linear interpolation method and a cubic-convolution method are excellent in terms of image. However, a method using a bi-linear method is the simplest, in which correction can be conducted without adding hardware newly. Therefore, in the present embodiment, an example in which correction was made using a bi-linear method.

Now, provided that the targeted resolution in the primary scanning direction is 300.0 dpi, the corrected position when the bi-linear method was used can be determined by the following equation. Namely, as for targeted pixel width (in the present embodiment, 2560 pixels), from the difference of actual resolution D and targeted resolution 300 dpi, pixel number N to be corrected is calculated from equation (5) described later. From equation (6), interpolation interval I in which at what interval addition/elimination of pixels should be conducted is determined. Here, "N" and "I" are integers. They are obtained by rounding the right side values of equations (5) and (6). In the case of this method, it is hypothesized that there is no shift of the pixel of print head at the print head of address 0, the correction position is set in such a manner that pixels are not either added or eliminated at the position of address "0". In addition, in order that the position of address 2559 finally meets, in other words, interpolation is so set that each recording head coincides without pixel shifting at both ends in the primary scanning direction when an image is outputted at the maximum effective width, interpolation is not conducted at such positions. Incidentally, when "N" value is positive, pixels are added, end when N values is negative, pixels are eliminated.

$N = [2560 \times (D/300 - 1)]$ (5)

$I = [2560 / (|N| + 1)]$ (6)

In this occasion, even when the number of pixels is the same, the printing width of low resolution print head is longer and that of high resolution become short. In such occasion, in order to the printing width of high resolution print head, it is necessary to reduce printing width of low resolution print head.

In aforesaid correction processing, if pixels are simply eliminated at a certain position, the degree of extinguishing of image pattern becomes prominent in a specific base, changing appearance of image.

In such a case, it may be preferable that entire pixels on a line in the primary scanning direction are divided into a block for every I-th pixel so as to determine a pixel to be eliminated, that a pixel is eliminated for every plural pixels, or that a pixel to be eliminated is shifted for every line not so as to eliminate pixels at the same position on the first line and on the subsequent second line. That is, in the case that a pixel to be eliminated is designated, a position of a pixel to be eliminated on the next recording line is determined as a pixel other than the designated pixel on the current recording line. As an example of a designating method, a position of a pixel to be eliminated is determined on the basis of random numbers generated by a random number generating circuit, whereby errors caused by the eliminated pixels can be dispersed onto the entire image.

Figure 7:
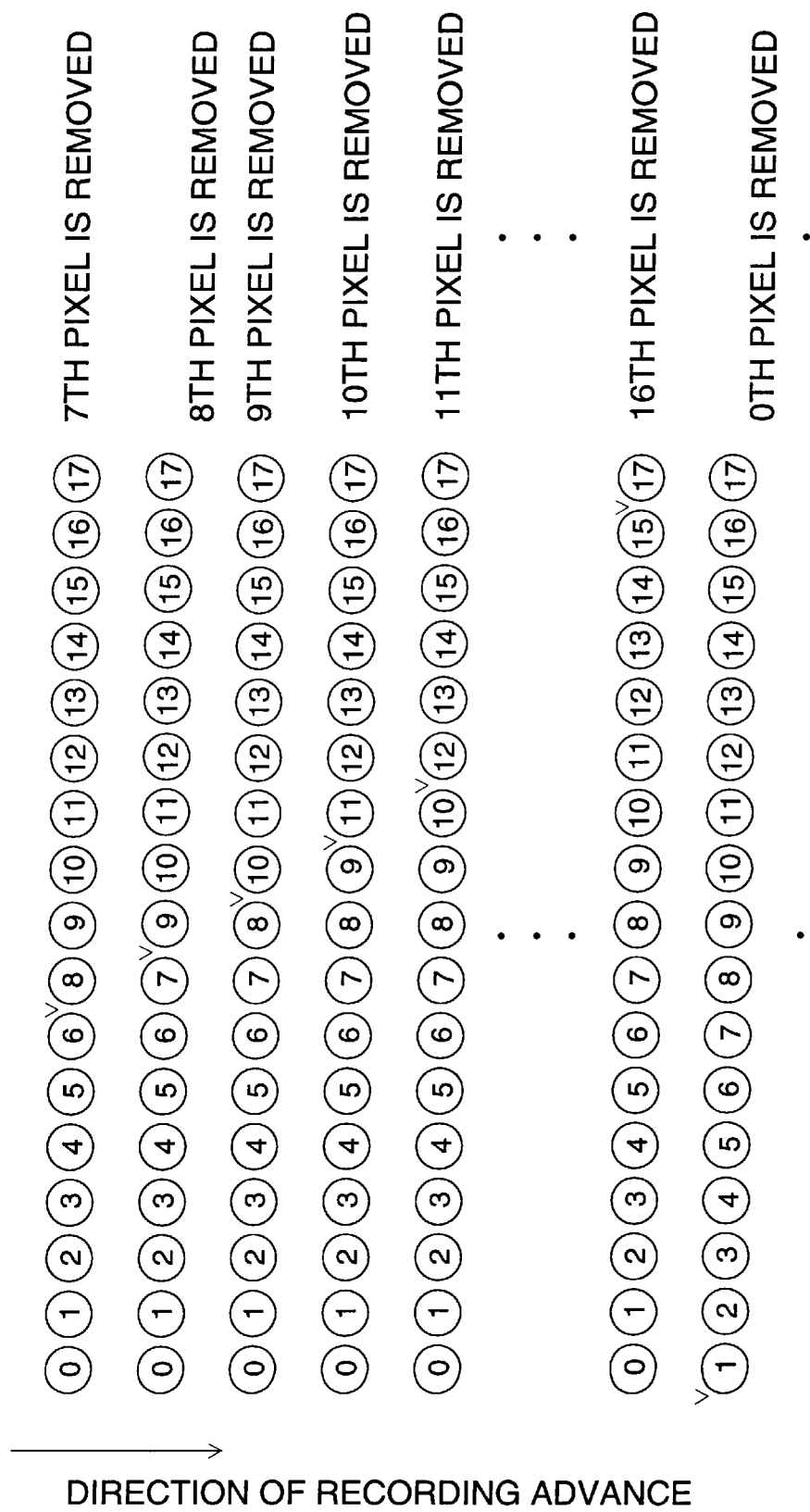
FIG. 7 is a drawing explaining a method of pixel eliminating.

FIG. 7 shows one example of aforesaid processing. In the status of an image outputting signal onto a print head, following advancement of recording of images, by shifting pixels to be eliminated one by one regularly for recording, the degree of extinguishing of image pattern can be lightened.

Incidentally, if a linear interpolation method or a cubic convolution method is used, pixels are corrected equivalently all through image data. Therefore, influence by image quality deterioration due to elimination/addition of pixels is little. Therefore, it is not necessary to add the above-mentioned method specifically.

The above-mentioned image data correction is conducted in resolution conversion section 45. However, if it is a simple processing, correction may be conducted in the course of transferring image from computer 41.

As explained above, in the present embodiment, by measuring absolution value of the resolution of each print head by the use of a chart pattern outputted by means of each print head, the difference of resolution of each print head between actual resolution and targeted resolution becomes apparent. Since correction processing of image detain which image data is magnified or reduced based on the difference of aforesaid resolution, shift of pixel position due to the difference of aforesaid resolution can be corrected accurately. Therefore, color shift of an image recorded is minimized and color blur can be reduced.

Next, the second embodiment in which image data is corrected by measuring shift amount of pixels of each print head at end portion of print head in such a manner that resolution of each print head should be met to that of the print head to be standardized.

FIG. 8(a) shows status of pixels of image outputting signal on two print head before correction processing is conducted. Incidentally, marks "0" represents a recording element of respective print head. Numbers represents address of image outputting signal on DRAM. In FIG. 8(a), when print headland print head 2 are coincided at a position in accordance with address "0" (the left end portion of the print head), the position of address 16 of print head 2 (the right end portion of the print head) coincides the position of address 17 of print head 1.

In such occasions, if "resolution" of the print head 2 is defined to be the standard, position of image recorded can be coincided due to magnifying processing of image data (image outputting signal) by a bi-linear method. Namely, as shown in FIG. 8(b), by outputting the pixel of address 7 which is located in the vicinity of the center of the figure doubly, and then by outputting address 8 and thereafter successively (not at the ambient section such as address 1 or address 15 from the viewpoint that the pixel position meets at the ambient portion), one pixel is added to the image outputting signal on print head 1 so that the position of address 15 on print head 2 can be coincided with the position of address 15 on print head 1.

Figure 8:
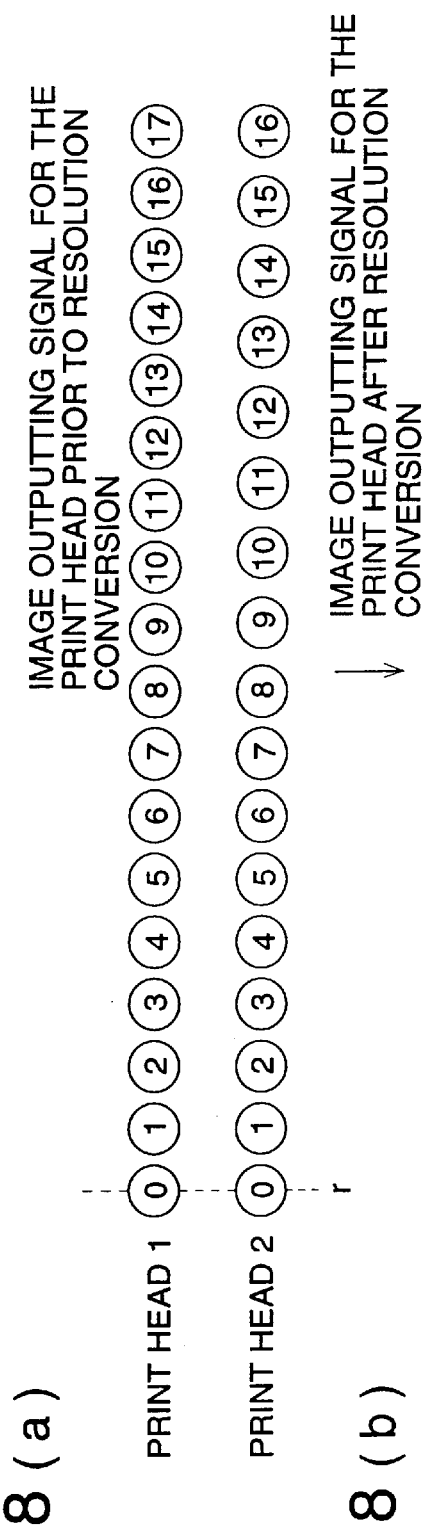
FIGS. 8(a)–8(c) are drawings explaining a correction method of resolution by a bi-linear method.

If "resolution" of the print head 1 is defined to be the standard, as shown in FIG. 8(*c*), resolution is corrected by outputting a pixel on address 7 on the image outputting signal on print head 2.

Under the above-mentioned method, when the resolution of print head 15G for G color which is a color gradient having the highest visual sensitivity is set to be the standard, deterioration of image quality due to interpolation is inhibited and, thereafter, recording is conducted after the position corresponding to address 0 of print head 15R for R color on DRAM is coincided with the position of address "0" of print head 15G for G color, suppose that the recording position of print head 15R for R color is shifted to address "0" by about 500 μm at the position of 2559th pixel of print head. In this instance, by adding an image outputting signal having a length corresponding to 500 μm (for example, for 6 pixels [500/(25.4×1000/300)]=6) to an address in print head 15R for R color, resolution of each print head can easily be met.

Incidentally, in the above-mentioned case, since B color gradient is inferior from the viewpoint of both of visual sensitivity and frequency properties, it is appropriate to increase interpolation load.

Here, shift of recording position in the present embodiment evaluates relative shift amount. Therefore, it is not necessary to measure absolute resolution. Therefore, shift amount of the recording position may compactly tee measured by the use of magnifier roupe which can measure the length of chart pattern outputted. Incidentally, in order to add/eliminate pixel of image outputting signal, the same method as described in the first embodiment may be adopted.

As explained above, in the present embodiment, due to that a print head which would be the standard for resolution is set and correction (magnification/reduction processing of an image outputting signal) of resolution of the other print head is conducted in such a manner that the resolution of the other print head meets that of the standard print head, color shift is compactly minimized and a visualized image in which color blur is little can be obtained.

Next, the third embodiment in which image data is corrected by measuring resolution for each of recording element block of the print head.

For example, in the case that one print head is structured after combining plural of recording element blocks each having 256 pixels (recording element), connection error may occur for every recording element block in addition to ordinary block pitch errors. Interval of recording element at the connection section of the recording element block are considered to be as shown in FIGS. 9(*a*) and (*b*).

Figure 9:
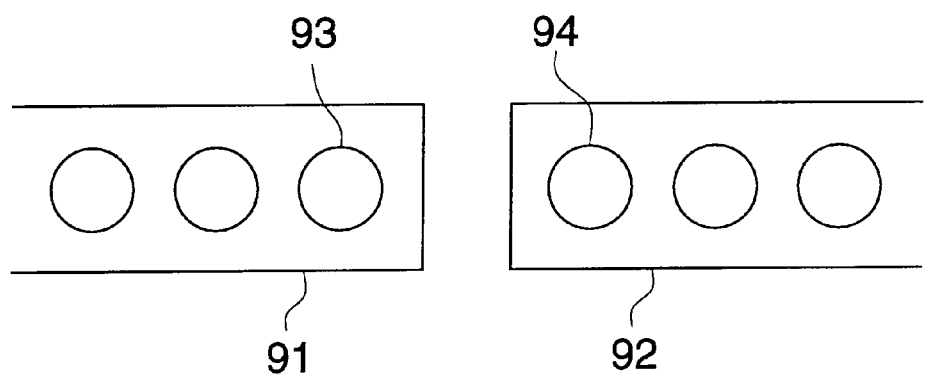
FIGS. 9(a) and 9(b) are drawings explaining connection condition between recording element blocks of print head.
Figure 9:
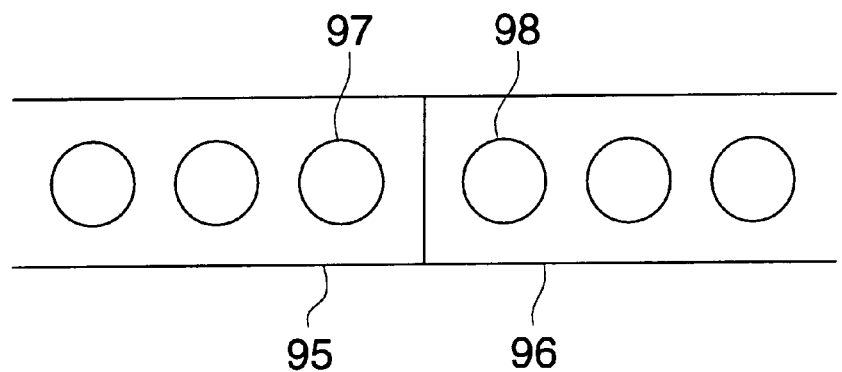

Namely, in FIG. 9(*a*), recording element block 91 and recording element block 92 are separated from ordinary connection status. Due to this, interval between pixel 93 and 94 is longer than the interval of pixel inside each recording element block. On the other hand, in FIG. 9(*b*), recording element block 95 and 96 are closer than ordinary connection status, and therefor the interval of pixel 97 and 98 is shorter than pixel interval inside each block. This is derived from that adjustment of adjoining pixel interval at the joint section is difficult.

Since the above-mentioned connection status of the recording element block is considered, it is difficult to hyposize that pixels are located at a constant interval in the primary scanning direction. Due to a method conducting a uniform image processing in the primary scanning direction, it is impossible to prevent shift of position of an image recorded. Since shift of resolution mainly derives from combination error of recording element blocks, it is desirable to divide pixels for each recording element block (for example, 256 pixels) on the print head and to correct image data after measuring resolution for each recording element block.

Figure 6:
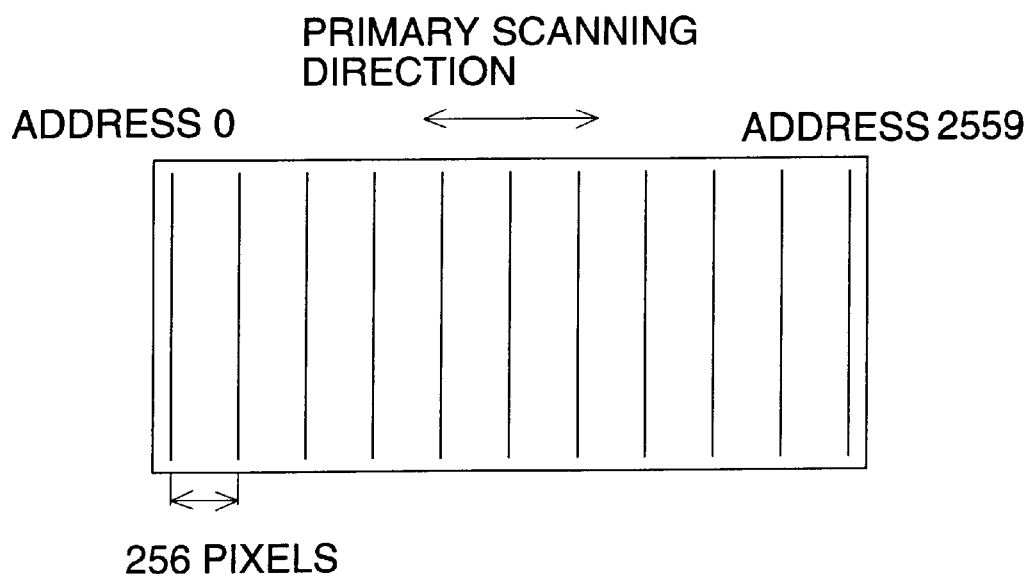
FIGS. 6(a) and 6(b) are drawings explaining a measurement method of absolute resolution.
Figure 6:
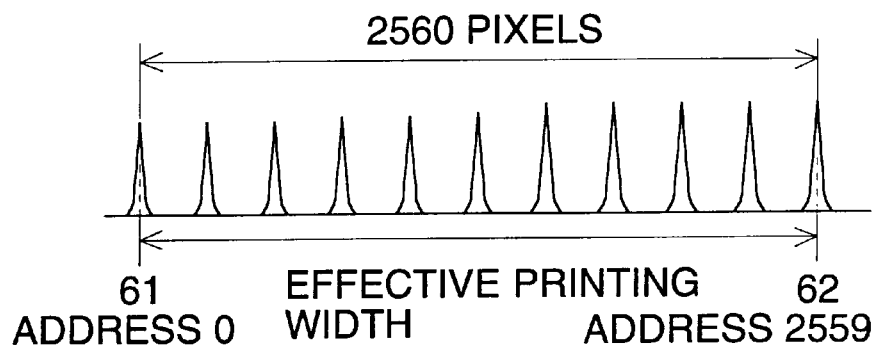

For example, if a recording element block is composed of 128 pixels, pixels are separated in the following manner that 0th to 127th pixels on the print head is defined to be the first recording element block; 128th to 255th pixels are defined to be the second recording element block. As shown in FIG. 6, line is outputted for each of recording element block such as 0th pixel, 128th pixel, etc., and a chart pattern is recorded. From this chart pattern, resolution for each recording element block is measured.

Figure 10:
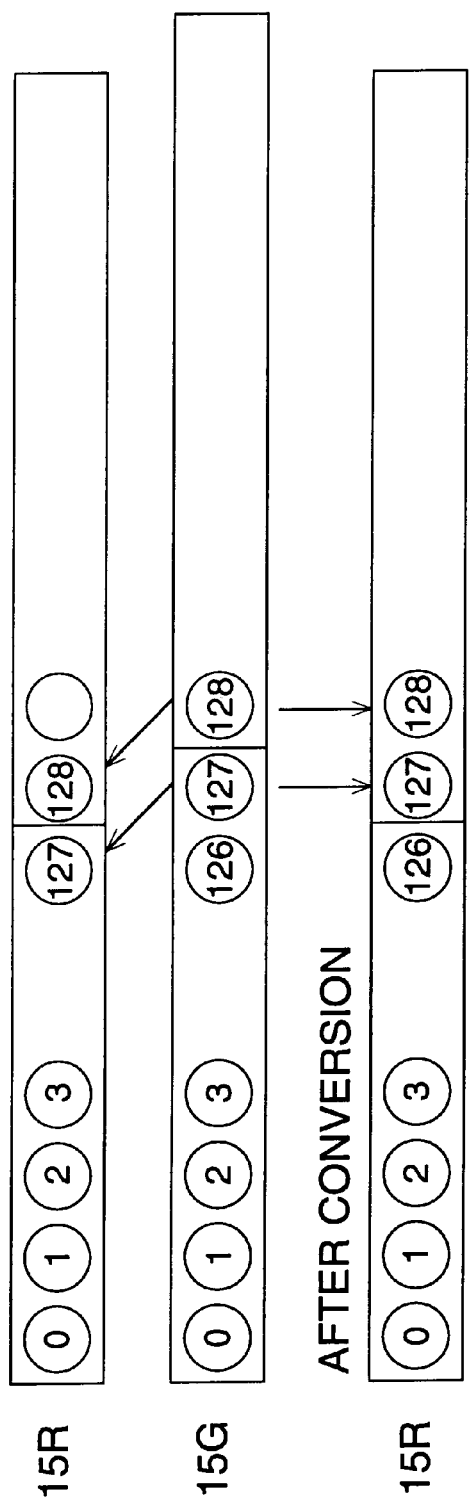
FIG. 10 is a drawing explaining a method correcting resolution for each of recording element block in the third embodiment.
Figure 11:
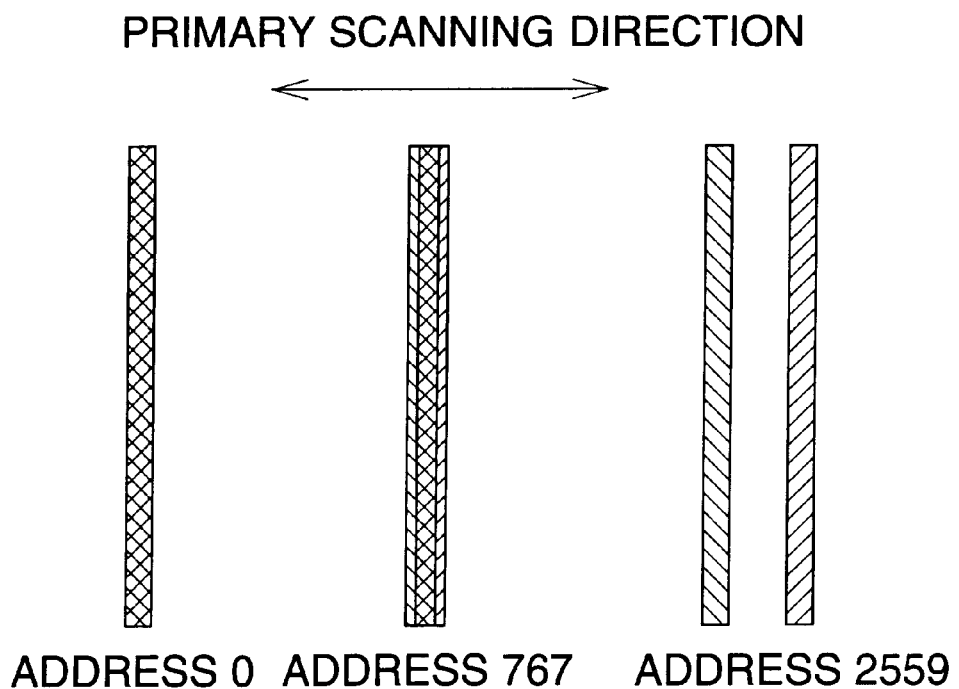
FIG. 11 is a drawing explaining the occurrence of color blur and color shift due to the difference of resolution.

Shift of resolution for each of the resulting recording element block is corrected under the following procedure. For example, when the resolution of print head 15G for G color is defined to be the standard resolution, as shown in FIG. 10, first, the position of 0th pixel of print head 15G for G color is aligned with the position of 0th pixel of print head 15R for R color. Then, pixel, on print head 15R for R color, corresponding to the position of 127th pixel on print head 15G for G color is courted. If the address of print head 15R for R color, on DRAM, which corresponds to aforesaid pixel number is address 128, the pixel of image outputting signal on the way is interpolated in such a manner that aforesaid address 128 becomes 127. Incidentally, with regard to pixel interpolation, methods described in the first embodiment and the second embodiment can be used as they are.

As described above, on the position of 127th pixel on print head 15G for G color, address 127 is located on print head 15R for R colon On the position of 128th pixel on print head 15G for G color, address 128 is located on print head 15R for R colon.

Due to providing aforesaid processing successively on each recording element block, it can be corrected that pixel recording positions on print head 15R for R color and on print head 15G for G color are located almost at the same position.

In addition, by providing similar correction processing on print head 15B for B color, pixel recording positions on print head 15B for B color and on print head 15G for G color are located almost et the same position.

Incidentally, the print head which is the standard for resolution is not necessarily print head 15G for G color.

As shown in the first embodiment, targeted resolution such as 300 dpi may be set, and then, image data on each print head may be corrected in such a manner that each print head meets aforesaid resolution.

In the case of the present embodiment, the difference at the joint section of recording element block becomes in question, it is effective to eliminate/add at the joins section of each recording element block. However, there is no problem if correction is conducted at the interim section inside each of recording element block. The larger the size, the more the difference apparent.

When the linear interpolation method or the cubic convolution method is used, line interval of the chart pattern may be aligned to print head 15R for R color which is the standard of resolution. Or, it may be set to meet the targeted resolution. Excess/shortage of pixel may be corrected by means of the above-mentioned method.

As explained above, in the present embodiment, on joint error for each of recording element block having large possibility of the occurrence on a print head such as an LED, the accuracy of the position of an image recorded is increased to be aligned by measuring resolution for each of recording element and correcting image data in accordance with resolution for each of aforesaid recording element block. Therefore, visualized image having higher quality can be obtained.

Next, an embodiment in which position shift of exposure (recording) between print heads in the secondary scanning direction is corrected will be explained.

First, basic synchronous control of exposure timing of each print head in the secondary scanning direction will be explained.

Figure 14:
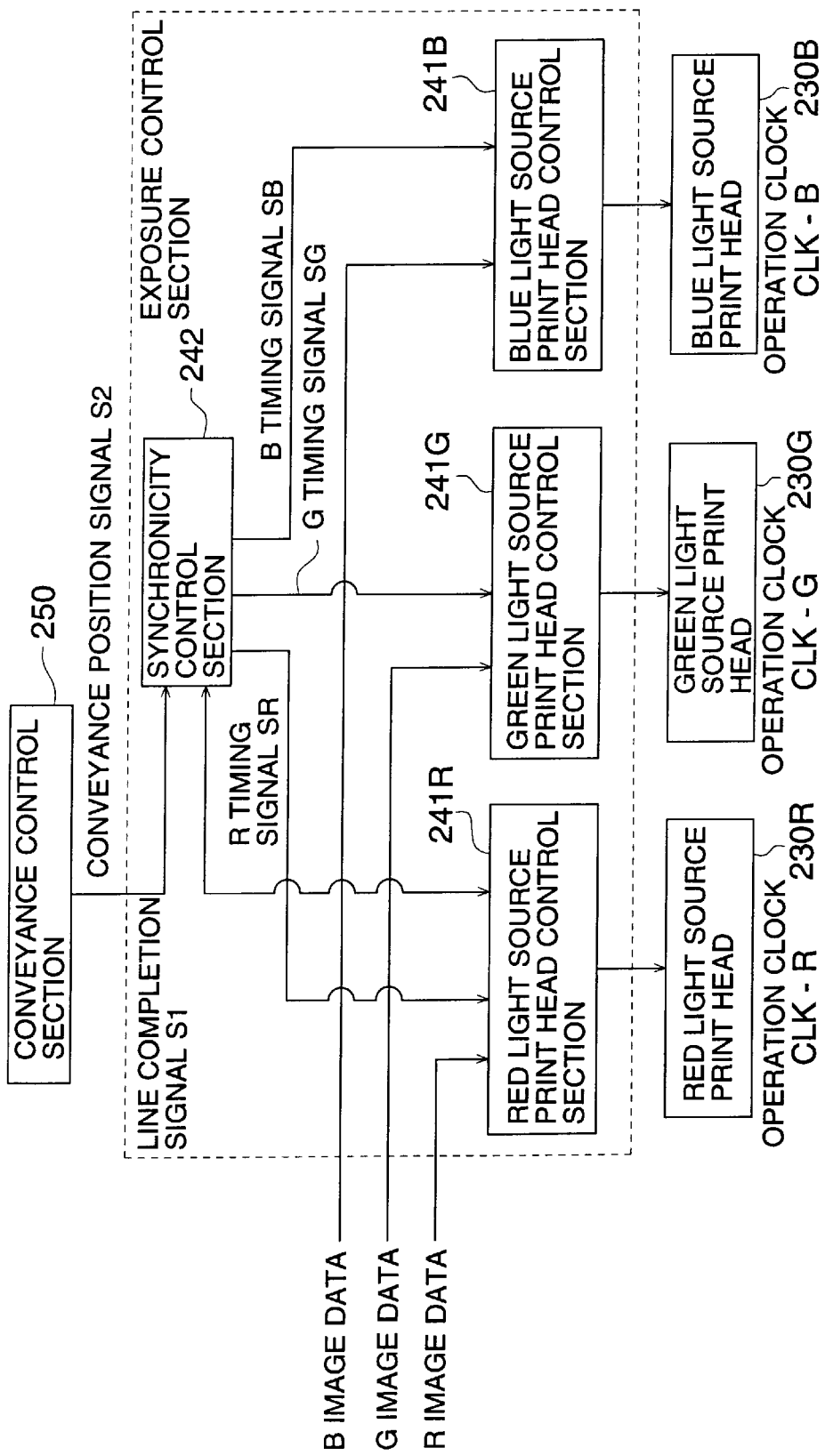
FIG. 14 is a block diagram showing a synchronous control circuit of print head.

In FIG. 14, R color light source print head 230R is actuated by means of operation clock CLK-R. G color light source print head 230G is actuated by means of operation clock CLK-G. B color light source print head 230B is actuated by means of CLK-B.

R color light source print head control section 241R, G color light source print head control section 241G, B color light source print head control section 241B respectively generate operation clock CLK-R, clock CLK-G end crock CLK-B. As described above, based on respective clock, each print head is controlled and each image corresponding to image data is recorded.

Figure 15:
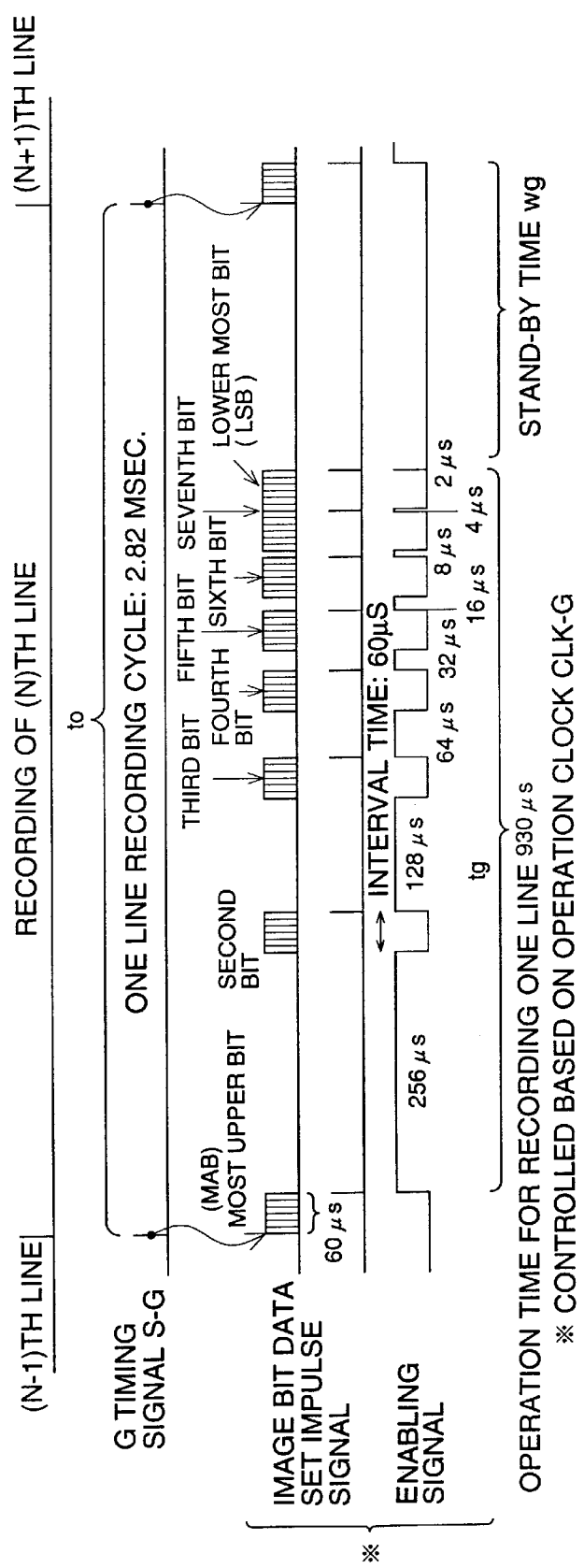
FIG. 15 is a timing chart showing operation of print head for G colon.

Timing of the above-mentioned operation of each print head control section 241R, 241G and 241B for the recording of each of one line is taken synchronous control by R timing signal S-R, G timing signal S-G and B timing signal S-B respectively from synchronous control section 242. FIG. 15 shows operation of G color, in which when it receives G timing signal S-G from synchronous control section 242, transfer of image bit data (MSB) for one line to G color light source print head 230G is started. After a series of the above-mentioned recording operation for one line for recording operation time tg based on operation clock CLK-G, it becomes stand-by status until it receives next timing signal S-G. Incidentally, with regard to R color and B color, similar operation is conducted. In control as shown in FIG. 15, light is emitted during inable time which corresponds to the density value allotted to each bit.

"t0" is a recording cycle of one line. Here, t0 is set to be 2.82 msec. as time in which exposure is conducted on photographic paper P which is conveyed at an equivalent speed of 30 mm/see at the pixel density of 300 dpi.

Synchronous control section 242 sends each timing signals S-R, S-G and S-B for recording for one line at a cycle of "t0" for conducting synchronous control of three colors for each of one line.

Figure 16:
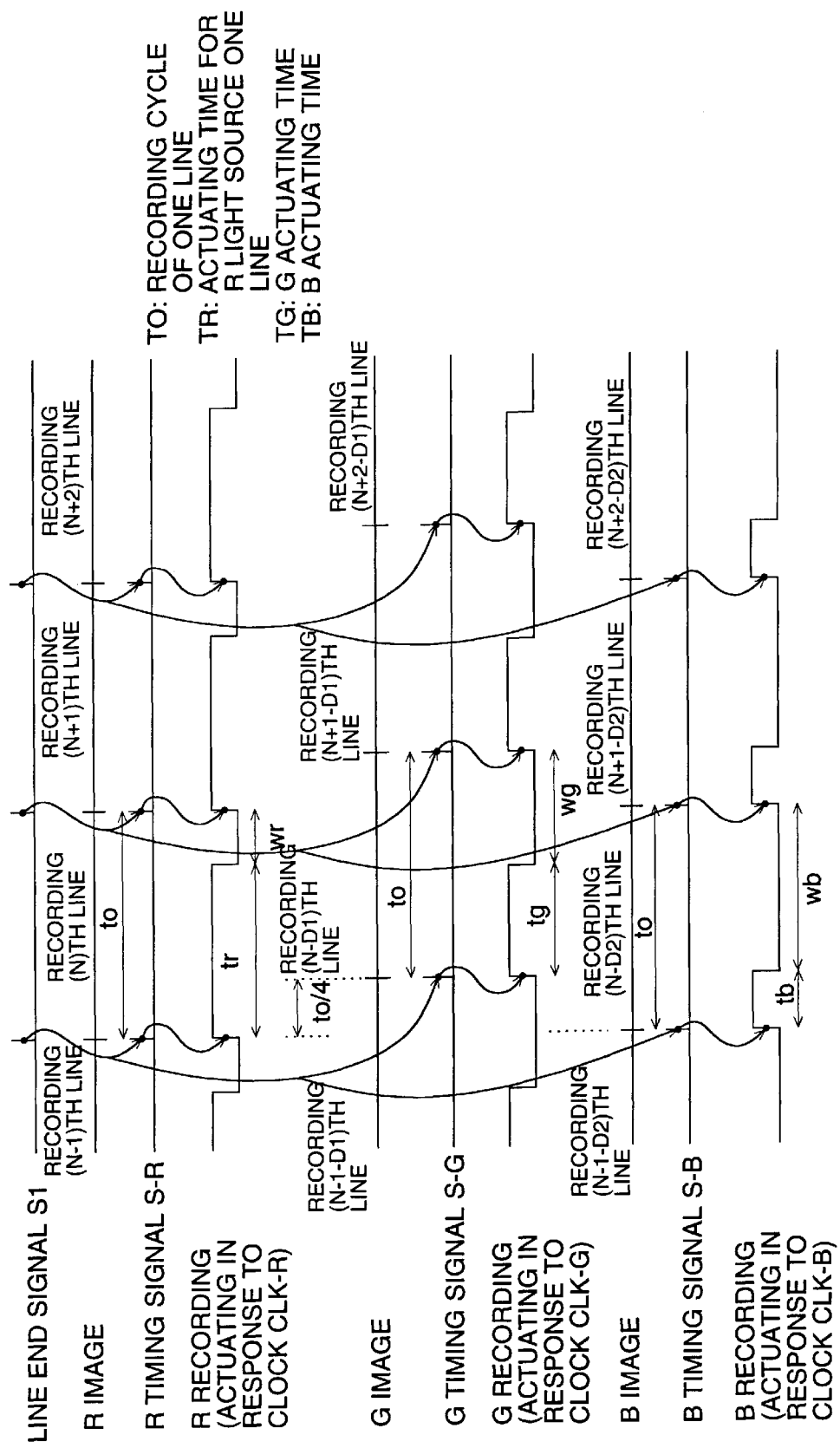
FIG. 16 is a timing chart showing behavior of three color synchronous control.

FIG. 16 shows operation that synchronous control section 42 outputs each timing signals S-R, S-G and S-B in such a manner that recording starting position becomes for lines for each color on photographic paper P become equivalent. However, the present invention is not limited thereto. Control in which specific timing in recording of one line becomes equivalent is allowed.

Specifically, by outputting each timing signal in such a manner that the recording position at half of recording operation time of each line for each color tr, tg and tb, i.e., tr/2, tg/2 and tb/2 on photographic paper P becomes equivalent, position of each color dot of each line is more accurately superposed, thereby image of high quality in which color shift is little is resulted in.

Figure 17:
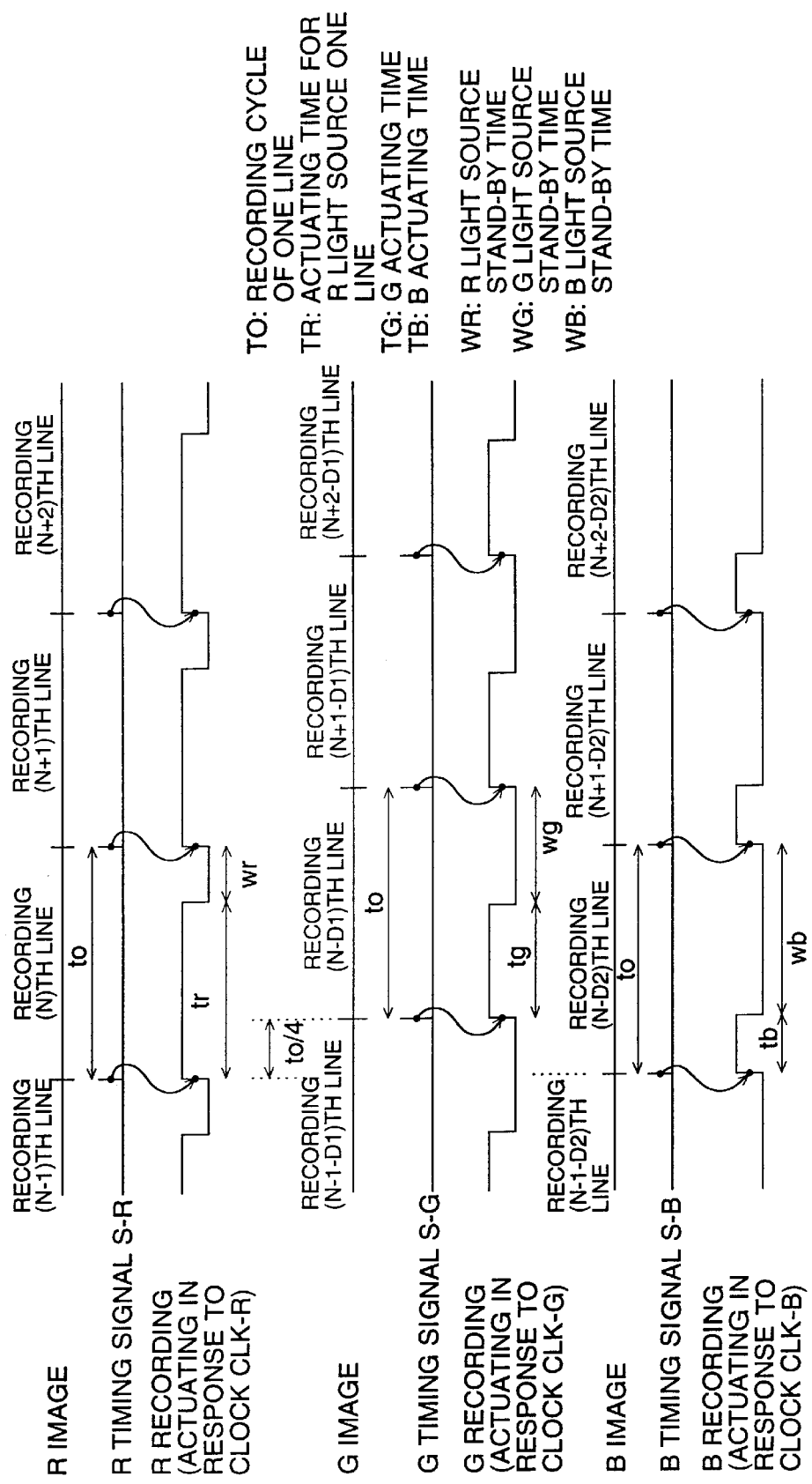
FIG. 17 is a timing chart showing behavior of three color synchronous control.

FIG. 17 shows an example in which outputting timing of each timing signals S-R, S-G and S-B from synchronous control section 242 is conducted teased on line finish signal S1. Line finish signal S1 is a signal outputted to synchronous control section 242 from R color light source print head control section 241R when one line recording cycle (t0) of R color light source print head 230R is finished. It is preferable since recording cycle (t0) of one cycle can be adjusted simply only due to adjusting only one color while synchronous control of each color for one line is kept and color shift due to accumulation of shifting of frequency of recording cycle for one line of each color is controlled, by charging operation clock CLK-G, stand-by time Wr is changed or only adjustment of R color light source print head control section 241R is conducted.

If timing of each timing signal S-R, S-G and S-B are the same, it is preferable if Si is sent to each print head control section directly as S-R, S-G or S-B not through synchronous control section 242, because structure becomes simple.

In addition, by the use of conveyance position signal S2 sent from conveyance control section 250 in place of S1 in FIG. 17, exposure timing can be taken with a position at which photographic paper P is conveyed. Therefore, even if there is conveyance speed unevenness, the position of the image of each color can accurately be controlled. There is a method to obtain conveyance position signal S2 by detecting conveyance position of a photographic paper by one line by one by detecting the rotation angle of the conveyance roller by means of a rotary encoder.

Next, another example on the structure of the print head will be explained hereinafter.

Figure 18:
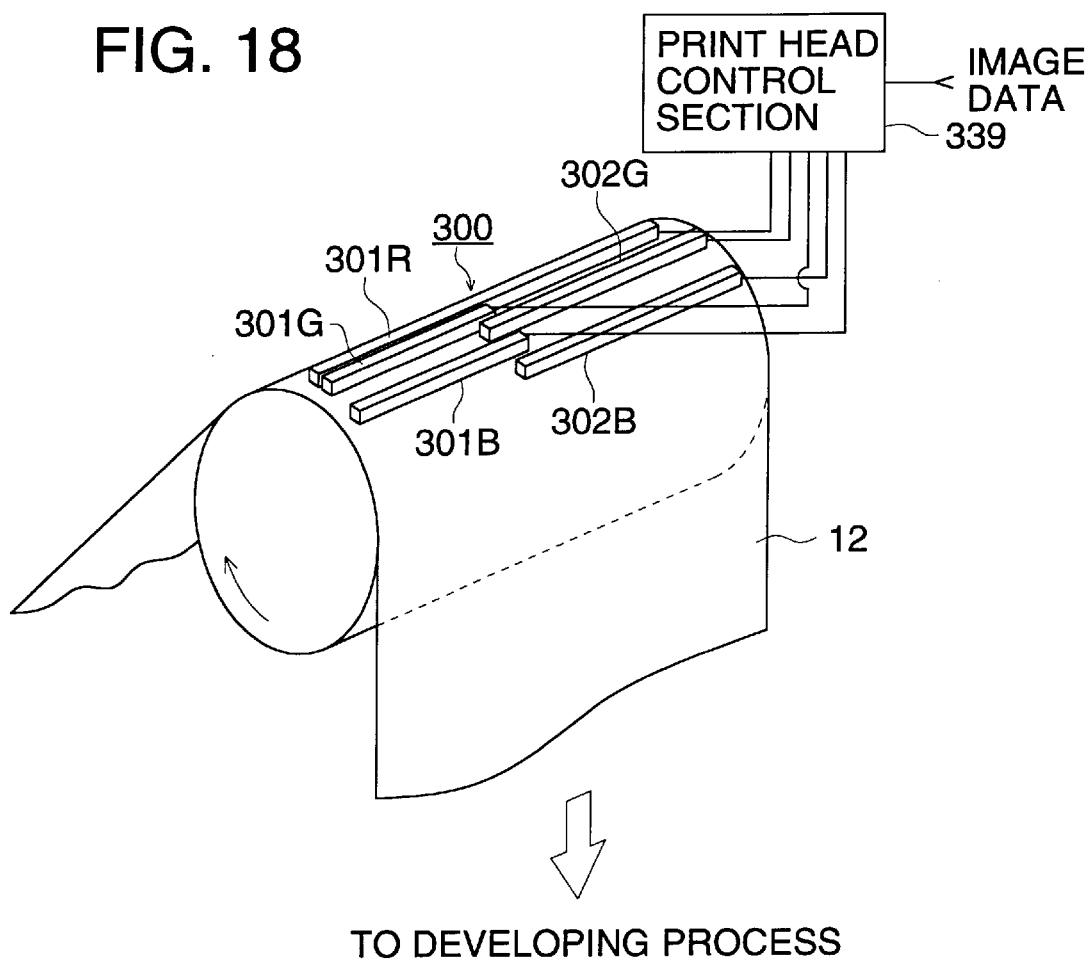
FIG. 18 is a perspective view showing an example in which print head of the same color is arranged in a zigzag form.

As shown in FIG. 18, in the exposure section for each color, plural print heads of the same color having a length which is shorter than the recording length for one line may be provided in a zigzag form so that plural print heads has sufficient length for recording one line.

Figure 19:
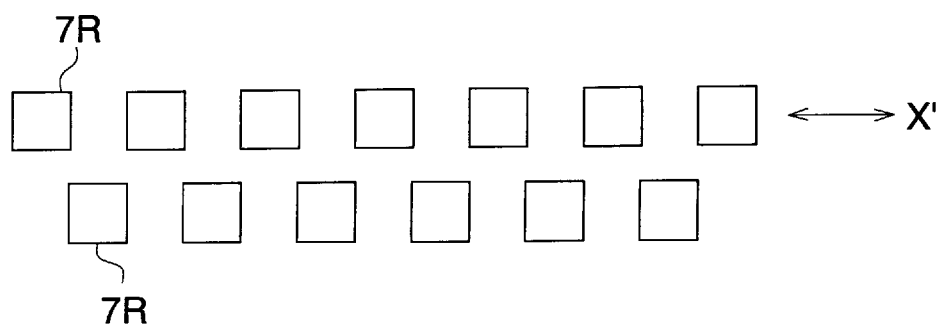
FIG. 19 is a drawing showing an arrangement of recording elements in a zigzag form.

In FIG. 18, R color exposure section 300R is structured by print head 301R which uses LED arrays in which LED7R, which are recording elements, are arranged in a line shape. With regard to LED array, LED 7R may tee arranged approximately linearly. However, each LED may be arranged in a zigzag form as shown in FIG. 19.

Figure 20:
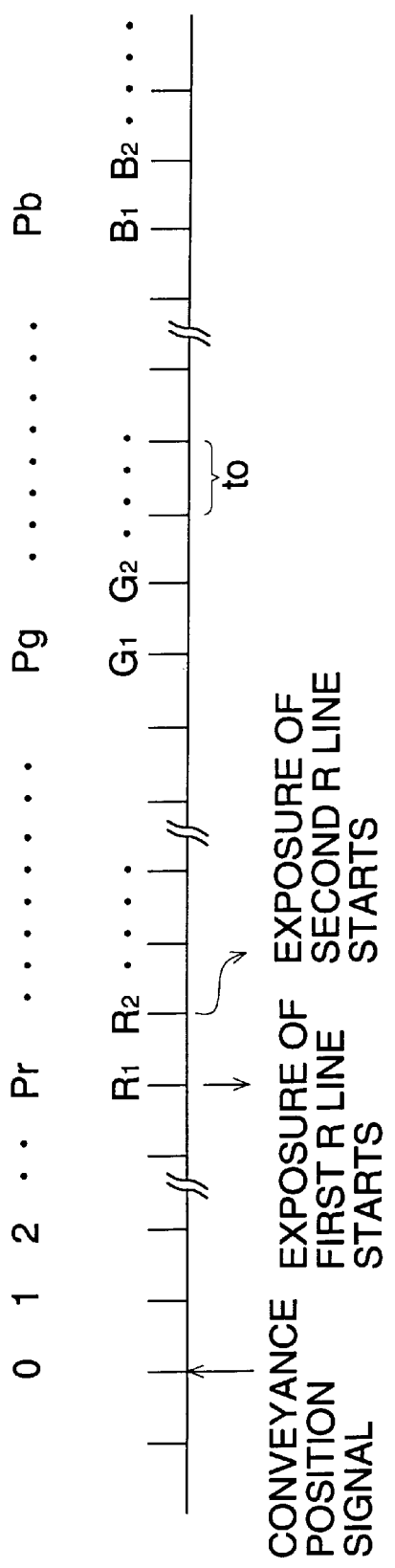
FIG. 20 is a time chart showing an example of how to set exposure timing in the secondary scanning direction.

Here, set value of outputting timing of timing signals S-R, S-G and S-B which determine exposure position of the above mentioned R, G and B in the secondary scanning direction can relatively be modified. FIG. 20 shows outputting status of the above-mentioned timing signals S-R, S-G and S-B on a time series basis, in which after receiving a conveyance position signal, exposure starting signal Ra which is the first line of R, receiving (Pr)th pulse. With regard to G and B too, the exposure starting signals G1 and B1 for the first line are sent, receiving (Pg)th and (Pb)th pulses respectively. The values of the above-mentioned Pr, Pg and Pb are at least relatively modifiable. In the present embodiment, the pulse interval is set to recording cycle frequency t0 (=2.82 ms) of the above-mentioned one line. Due to this, correction of image shift one pixel unit in the secondary scanning direction. However, pulse interval may not only be "t0". "t0/1", "0/3", "2t0" and "5t0" may be allowed. Control can be conducted accordingly. For example, if the pulse interval is "t0/2", color shift control on a semi-pixel unit becomes possible.

The outputting frequency of the above-mentioned timing signals S-R, S-G and S-B is not limited to taking synchronously by outputting signals for one line as descried above. If color shift in the secondary scanning direction is corrected as in the present embodiment, it is considered not to be necessary to take synchronously only if correction is conducted. Therefore, a type in which the leading pixel outputs a signal every one image. If synchronousity is taken every one line, the color shift control function is more assured. However, control becomes too complicated If synchronous control is conducted with every small number lines, color shift due to piling of small amount of shift can sufficiently be controlled.

It is possible to conduct exposure operation immediately after receiving each timing signal. It is also possible to conduct exposure operation after posing a certain time. By modifying set amount for aforesaid certain time, more fine color shift control compared with correction of the above-mentioned pulse frequency unit can be conducted.

Next, formation of standard image for control color shift inhibition in the above-mentioned secondary scanning direction will be explained.

Figure 21:
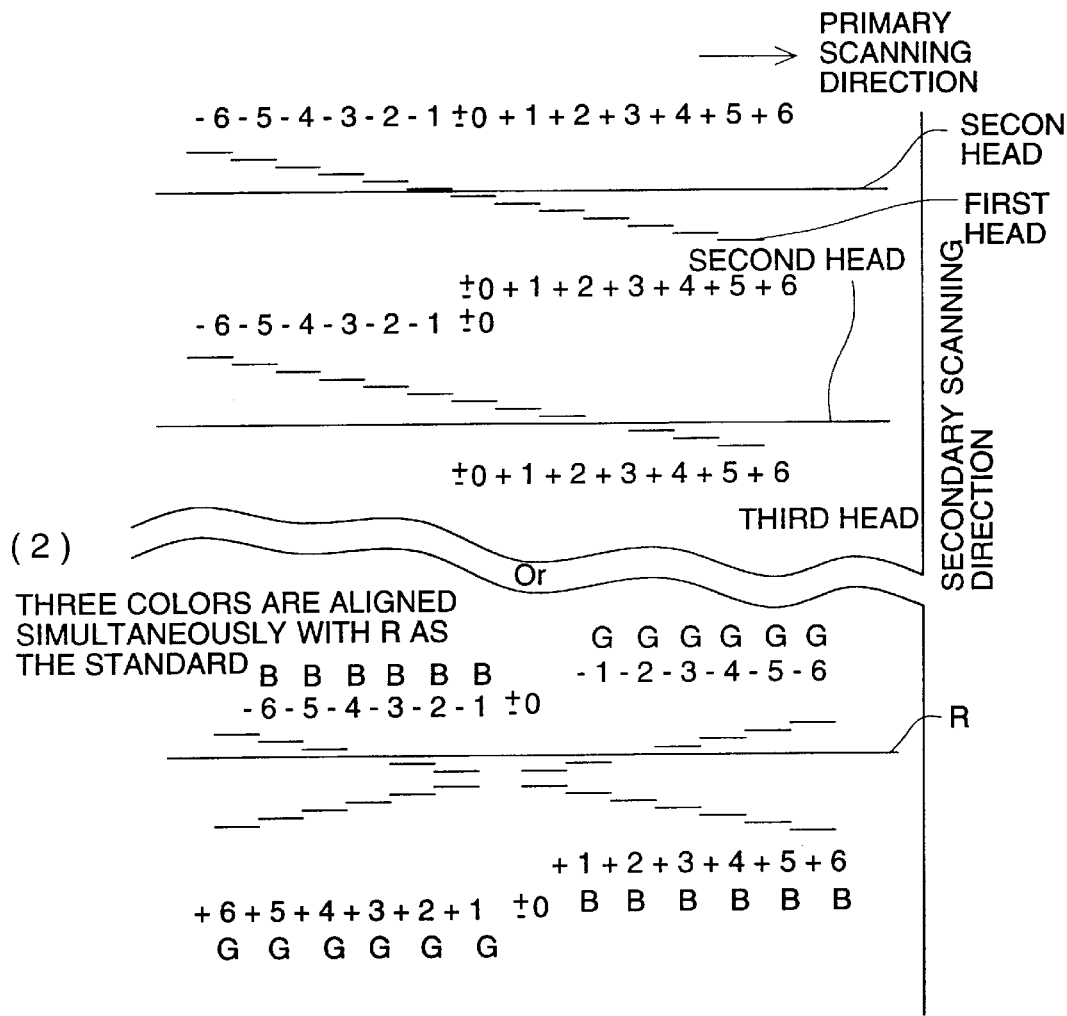
FIG. 21 is a drawing showing an example of a standard image for adjusting exposure timing in the secondary scanning direction.

As in FIG. 21, aforesaid standard image is formed on an image recording medium in accordance with standard image formation data stored in a memory such as an ambient storage medium such as a floppy disc, light magnetic disc and a memory card or a hard disc, RAM and ROM inside the apparatus. In FIG. 21(1), with the standard print head, for example specific print head, for example, exposure timing of G color print head as the standard, an image is exposed for recording while set amount of exposure timing of R color print head is changed and shifted in the primary scanning direction in 13 steps from −6 to +6, and with G color print head a the standard, an image is exposed for recording while set amount of B color print head is changed are aligned.

In this occasion, in an example shown in FIG. 21, the amount adjusted of R color print head is −1. That of B color print head is +3. Respectively, standard G color print head and the exposure recording position in the secondary scanning direction are coincided.

FIG. 21(2) shows that, while exposure timing of R color print head is defined to be the standard, the set value of the exposure timing of exposure timing of G color print head and that of b color print head is changed in 13 steps (from −6 to +6) aforesaid exposure timing is shifted in the primary scanning direction for exposure and recording.

In FIG. 21(2), the amount adjusted of G print head was −2, end the amount adjusted of B print head as +3. Exposure recording position of the standard R color print head in the secondary scanning direction coincides.

Here, a shown in FIG. 21, all color are completely superposed in terms of the length position of primary scanning direction of each colon Apart of them may superpose, or nothing may superpose. All type may be allowed. The situation is the same as in the standard image for primary scanning direction descried later.

Based on measurement data by means of visual looking or scanner on the standard image obtained as above, the set amount of exposure timing is changed due to the numeral of the closest two pixels.

Provided that the initial vale was R of 100, G of 200 and B of 300, In the case of the above-mentioned FIG. 21(1), if adjustment is conducted in which r is −1, B is +3, the exposure recording position coincides.

R=100−1=99
G=200 (the standard regular value)
B=300+3=303.
In the case of FIG. 21 (2), similarly,
R=100
G=200−2=198
B=300−3=297

As described above, after modifying the set value of the print head of colors other than the standard color, the standard image may be formed again and it is allowed that they are brought into closest at ±0. It is similar in the case of the adjustment of color shift in the primary scanning direction described later.

Figure 22:
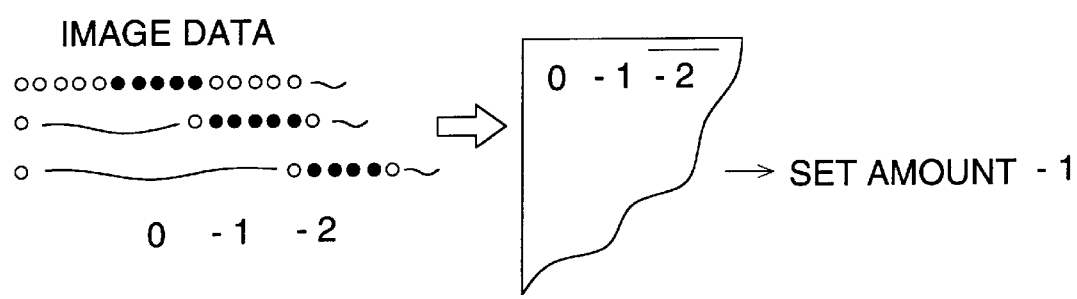
FIG. 22 is a drawing showing another example of a standard image for adjusting exposure timing in the secondary scanning direction.

Incidentally, in the case of the standard image formed by the present embodiment, set values of the print head of other colors were adjusted with the print head of specific color as the standard. Therefore, it is so preferable that adjustment can be simplified. However, a structure in which the set value of the print head of each color are independently adjusted. For example, if the set value of each color is adjusted in such a manner that the leading position of the color photographic paper (image recording medium) conveyed as shown in FIG. 22 and the recording starting position is aligned, recording can be conducted from the leading end of a photographic paper without a margin.

This is also true in terms of the primary scanning direction.

If the set value is adjusted, in which it is determined from which recording element image on the print head image data should be recorded, it is possible to record the image to the right edge and the left edge without any margin.

By the use of a similar chart as above, by adjusting the set value, in which it is determined from which recording element on the print head of the relevant color image data for each color should be recorded, an image of high image quality in which color deviation in the primary scanning direction is minimized can be obtained.

In the above-mentioned embodiment, when the linearity of the arrangement of the recording element of each print head is maintained, the amount of shifting of the recording position in the secondary scanning direction is not changed depending upon the position of the primary scanning direction. Therefore, if color shifting is corrected et a specific one point in the primary scanning direction, color shifting in other points can be restricted.

However, strictly speaking, there is a production error. In addition, the print heads are curved due to using environment and secular change. In addition, the print head is amounted obliquely on the secondary scanning direction. In addition, when paper clogging occurred during operation, the recording section on which the print head is loaded is moved for re-setting, the print head may be set obliquely.

Therefore, embodiment in which adjustment of exposure timing is independently conducted in accordance with the position of the print head in the primary scanning direction.

Figure 23:
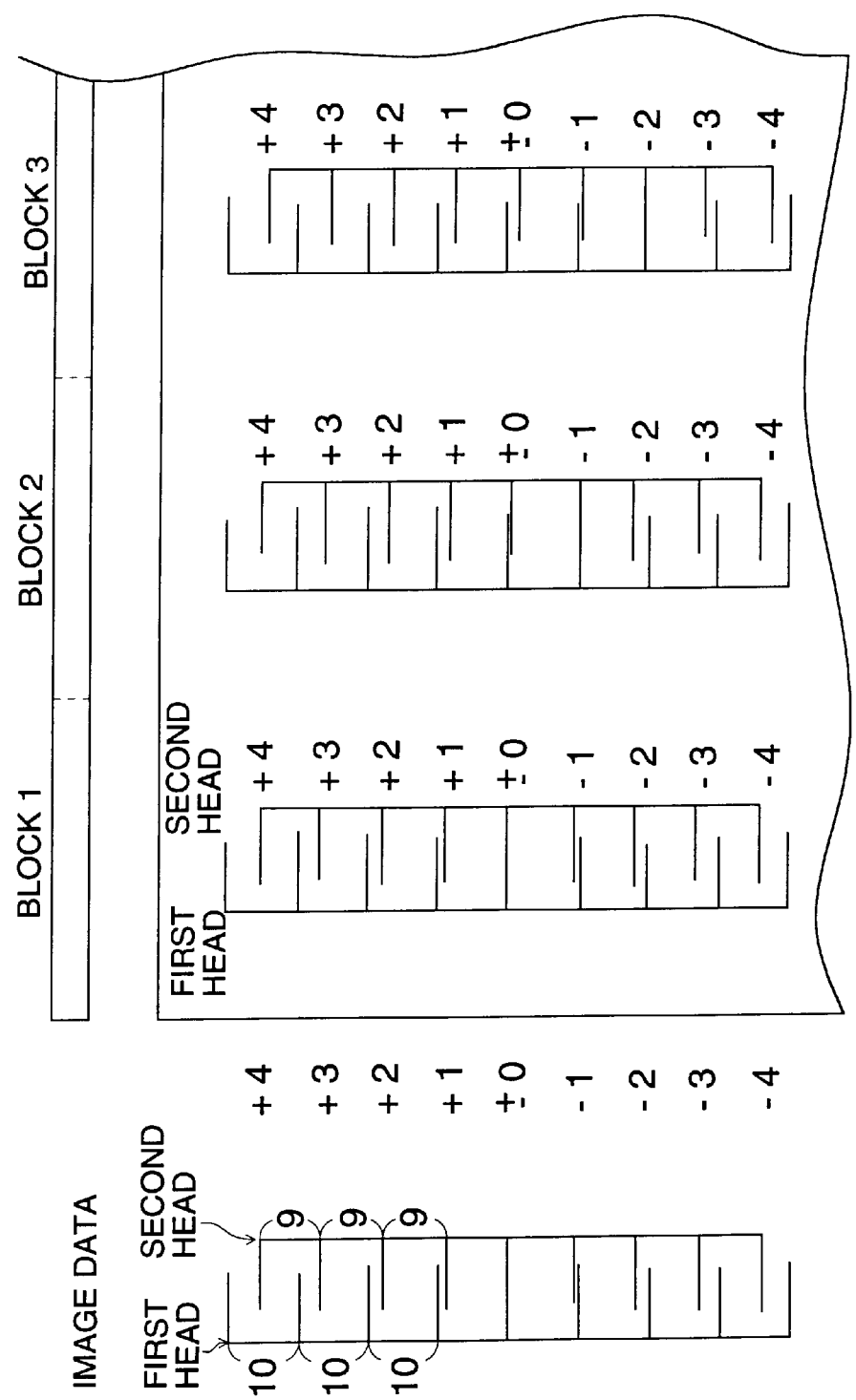

According to Embodiment shown in FIG. 23, recording element row of each print head is divided into plural of blocks 1, 2, 3 - - - so that the exposure timing of each block in the secondary scanning direction, i.e., recording position in the image recording medium can be adjustable. Accordingly, with a specific print head (the first head) as the standard, in each block, the print head (the first head) records a prescribed length at an interval of 10 lines. The second head records each line at an interval of 9 lines while aforesaid each line is adjoined with the line of the above-mentioned standard first head.

In the example of the standard image illustrated, in the second head end the block 1, lines are superposed et ±0. Therefore, with regard to aforesaid block 1, it is not necessary to modify the set value of exposure timing. In the case of block 2, lines are superposed at −1. Therefore, set value is decreased by 1. Similarly, in the case of block 3, by reducing set value by 2, set value can be adjusted for each block and recording position in the secondary scanning direction can be coincided. With regard to the remaining third head, based on a standard image similar to the above, adjustment for each block can be conducted. In addition, at the both sides of the recording of the standard first head, recording of the second head end recording of the third head can simultaneously be conducted. Recording area of the standard image can be reduced.

Here, the above-mentioned standard first head may have the most accurate linearity (when the kind of the head is different, it may be selected from the viewpoint of the length and stiffness. In addition, when a head is exchanged, it is preferable to select a non-exchanged head). In addition, it is preferable to use the head in which set amount between each block is adjusted between the end of a photosensitive paper in advance.

In addition, division of the above-mentioned block can be conducted appropriately. As described above, when one print head is formed by joining plural heads, there is a possibility that position shift occurs between each head. Therefore, it is rational to conduct adjustment by dividing a block for each head.

Theoretically, it is possible to adjust each line by comparing exposure timing for each of recording element with the standard value. Though adjustment becomes too thin (the adjustment unit is smaller than 1 pixel). If all recording elements are read by means of a scanner at high accuracy and set amount is automatically adjusted for each pixel, rapid and highly accurate adjustment can be conducted.

Next, an embodiment in which recording position in the primary scanning direction is adjusted (pitch shift is adjusted) will be explained. An embodiment in which recording position adjustment in aforesaid primary scanning direction was disclosed initially. Here, as a standard image as the above-mentioned chars, a system in which set value is easily corrected by recording recording position shift in the primary scanning direction (pitch shift) in a state close to actual condition will be shown.

Figure 24:
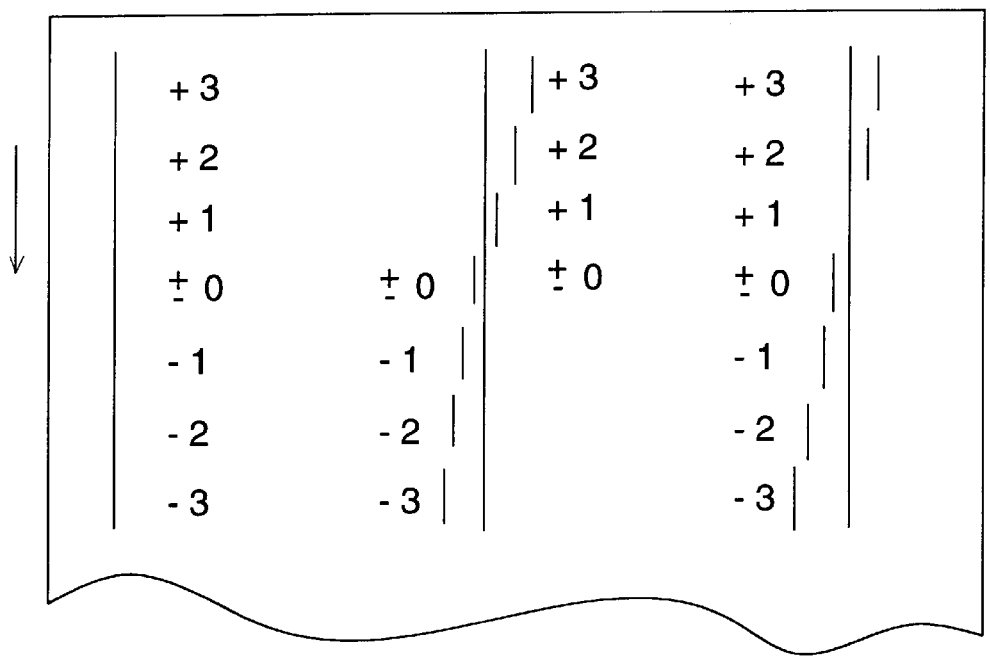
FIG. 24 is a drawing showing an example of a standard image for correcting pitch shift in the primary scanning direction.
Figure 25:
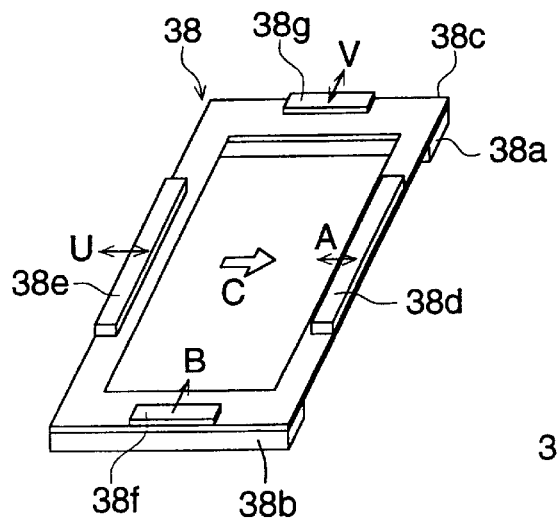
FIG. 25 is a drawing for explaining mounting/removing condition of unitized print head.
Figure 25:
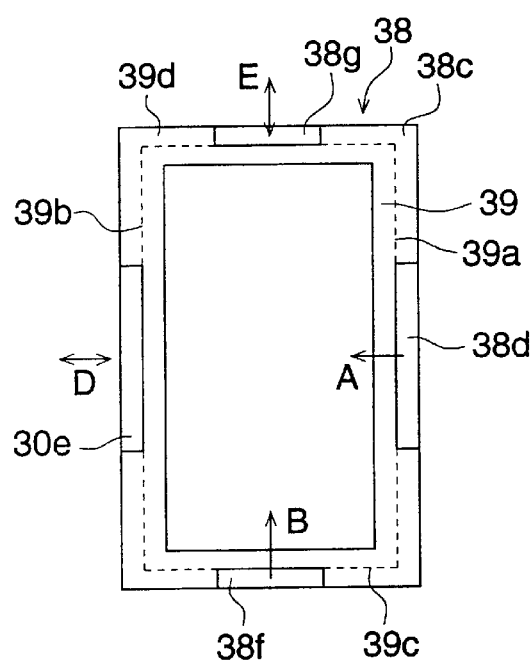
Figure 25:
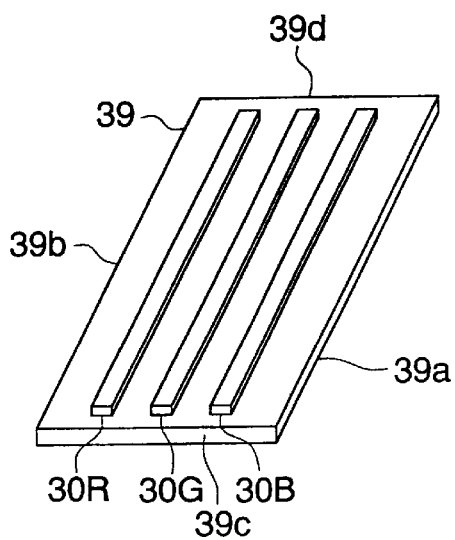

In FIG. 24, after the exposure starting position for each of the primary scanning direction line becomes identical between each print head, while the pixel number of the standard print head is kept equal with the number of recording element, to the print head compared and adjusted, the pixel number for one line in the primary scanning direction is added in the range of −3 to +3 (represented by +), no modification or eliminated lines are recorded for a prescribed length in the secondary scanning direction at the starting position in the primary scanning direction, the central position and the end position. Here, when i2, one pixel is added or eliminated from the front portion and the trailing portion in the primary scanning direction. When 35 3, one pixel is added or eliminated from the front portion, the mid portion and the trailing portion in the primary scanning direction for unifying.

For example, in the case of shown example in FIG. 24, +1 is superposed on the standard line at the end position. Therefore, it can be understood that, to the print head adjusted, an image data in which one pixel is added is favorable.

Pixel number to be added or eliminated is known only looking at the end position. However, if the interim position is recorded, it will be referential when determining a position where a pixel is added or eliminated. Specifically, in the case of three color print head of R, G and B, by appropriately selecting the point of pixel added or eliminated from comparing second or third print head, color shift of three colors in the primary scanning direction can be minimum not only at the end position but also at the middle position. Note that the position where only pixel number added or eliminated is read after recording only the end position and then adding or eliminating may be calculated based on equation (6) described above. In the case of three colors of R, G and B, in the same manner as in adjustment in the secondary scanning direction too, the standard color of the first head and the remaining 2 colors may be arranged one by one for recording. In addition, recording area may be saved by recording the remaining 2 colors are recorded at the right side and the left side of the standard color simultaneously.

In the present embodiment, adjustment by magnifying or reducing image data in which pixels were added or eliminated was shown. If interpolation by means of each interpolation method such as a linear interpolation method or a cubic-convolution is conducted, recording position adjustment in the primary scanning direction may be conducted by selecting magnification ratio or reduction ration mostly closed to the line of the standard print head by conducting line recording together with recording magnifying ratio and reduction ratio (for example, ×1.001 or ×0.998) which corresponds at a specific primary scanning position in the same manner as in mentioned above by an image data magnified and reduced by means of plural steps of magnification ration and reduction ratio. In this occasion, pixel is corrected at a uniform ratio and shift of recording position in the primary scanning direction can be inhibited.

So far, embodiments on recording position adjustment in the primary scanning direction described above and initially and recording position adjustment in the secondary scanning direction were explained. If they are structured singly, recording position shift in the primary scanning direction and the recording position shift in the secondary scanning direction can be inhibited. By combining recording position shift in the primary scanning direction and the recording position shift in the secondary scanning direction, recording position shift in the primary scanning direction and in the secondary scanning direction can be inhibited simultaneously, truly high-quality image can be recorded.

If the present invention is applied to a monochrome image in which an image is recorded with plural print head, shift of recording position is minimized, and effects in which blur can be inhibited. Specifically, when a color image is recorded employing print heads for plural colors such as R, G and B, color shift can be inhibited. Thereby, noticeable image quality improvement effects can be obtained.

Next, mounting condition of plural print head onto an apparatus main body will be explained.

It is better that aforesaid print head is mounted on the apparatus main body removably. By this, if the print head is deteriorated, it can be replaced. In this occasion, shift of recording position in the primary scanning direction and the secondary scanning direction which occur due to replacement can be inhibited by either of the above-mentioned embodiments.

Here, if each print head can tee replaced independently, heads in which deterioration is serious may only be replaced. Running cost can be reduced. However, positional relationship with the other print heads due to replacement may be shifted in multiple direction. In addition, during operation, relative position shift may occur between print heads. Therefore, adjustment becomes complicated and frequency of adjustment has a possibility to be increased.

Therefore, an embodiment, in which plural print head is integrally mounted to form a unit end aforesaid unit maybe replaced, will be shown.

FIG. 25(a) is a perspective view in which unit 39 is removed from unit mounting section 38.

In unit mounting section 38, stand plate 38c is mounted on leg section 38a and 38b. Between leg section 38a and 38b, photographic paper P can be moved in an arrowed direction.

FIG. 25(b) is a plan view in which unit mounting section 38 was viewed from above. On a portion shown by a dot line, unit 39 is mounted. FIG. 25(c) is a perspective view of unit 39. Side surface 39a of unit 39 is pressed to an arrowed direction A with movable member 38d. Side surface 39b of unit 39 is pressed to position storing section 38e. Simultaneously, side surface 39c of unit 39 is pressed with movable member 38f. By pressing side surface 39d of unit 39 to position storing section 38g, unit 39 is fixed to unit 39 is removed from unit mounting section 38.

On the contrary, by moving movable members 38d and 38f to the reversal direction of arrows A and B, cover is opened so that unit 39 can be taken out of unit mounting section 38.

Position storing sections 38e and 38g are movable respectively in directions U and V, in which fine adjustment and moving mechanism and fixing mechanism are provided. When unit 39 is mounted on unit mounting section 38, by fine adjustment and moving mechanism of 38e and 38g, it is adjusted in such as manner that unit 39 can be mounted at a prescribed position. By fixing mechanism, unit storage sections 38e and 38g, mounting position of unit 39 can be stored.

Due to this, to mount unit 39 on the accurately same position as unit 39 was previously removed. Therefore, maintenance property is improved.

In this occasion, cables which connects each print heads 30R, 30G and 30B and exposure control section 40 can easily be removed/mounted from/to a connector.

Figure 26:
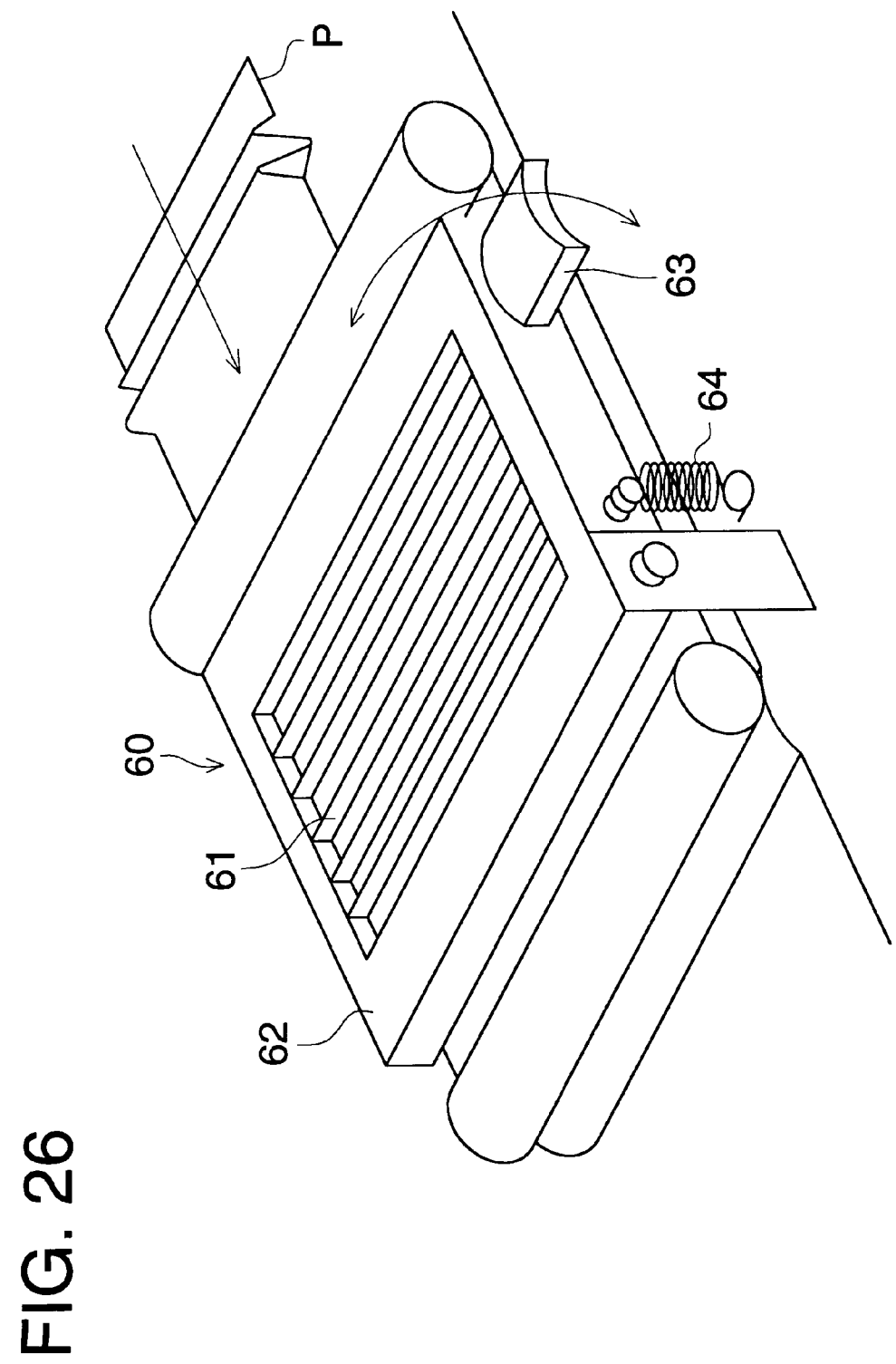
FIG. 26 is a perspective view showing another example of unitized print head.

FIG. 26 is an image recording apparatus in which photographic paper P is conveyed plainly. Unit 60 is composed of two respectively print heads 61 for R, G and B (totally, 6). One side along the secondary scanning direction of print head mounting frame 62 of the above-mentioned unit 39 is bound with a hinge. At the opposite side, knob 63 is provided. By holding aforesaid knob 63, aforesaid print head mounting frame 62 moves up and down perpendicular to conveyance direction of conveyance direction for freely openably/closely. In addition, aforesaid print head mounting frame 62 is set at a prescribed position controlled by a stopper through spring 64.

Due to the above-mentioned structure, even if paper clogging occurs as shown in FIG. 26, print head can be moved to a direction different from conveyance direction as unit 60. Therefore, photographic paper P can easily be removed. Thereafter, when unit 60 is re-set, even when color shift occurs, either of the each of above-mentioned color shift is minimized for obtaining high image quality image can be obtained.

What is claimed is:

1. An apparatus for recording a color image on a recording medium by relatively scanning the recording medium in a primary scanning direction and in a secondary scanning direction substantially perpendicular to the primary scanning direction, said apparatus comprising:

plural print heads arranged in parallel to each other in the secondary scanning direction, each said print head comprising a plurality of recording elements aligned along at least a single line in the primary scanning direction;

conveying means for conveying the recording medium relatively to the plural print heads in the secondary scanning direction;

control means for controlling each of the plural print heads to record a line image in the primary scanning direction on the recording medium so as to form plural component line images of the color image while the recording medium is conveyed in the secondary scanning direction, and for controlling image forming timing for each print head based on a timing setting value of each print head so as to superimpose the plural component line images on the conveyed recording medium;

reference component image forming means for controlling the plural print heads to form and superimpose plural reference component images on the conveyed recording medium based on reference component image data and the timing setting value of each print head;

timing correcting means for analyzing positional deviations in the secondary scanning direction among the plural superimposed reference component images, and correcting the timing setting value of each print head based on the positional deviations in the secondary scanning direction;

wherein the reference component image forming means determines an arrangement between image data and the plurality of recording elements in the primary scanning direction based on arrangement setting data; and arrangement correcting means for analyzing arrangement deviations in the arrangement between the image data and the plurality of recording elements in the primary scanning direction among the plural print heads from the plural superimposed reference component images, and correcting the arrangement setting data based on the arrangement deviations.

2. The apparatus of claim 1, wherein the plurality of recording elements of each print head are divided into plural blocks and the timing setting value of each print head is determined with respect to each block of each print head.

3. The apparatus of claim 1, wherein the timing setting value of each print head is determined with respect to each recording element of each print head.

4. The apparatus of claim 1, wherein the arrangement setting data is corrected so as to allow each print head to have a standard image resolution.

5. The apparatus of claim 4, wherein the plural print heads comprise an LED print head and a vacuum fluorescent print head, and an image resolution of the vacuum fluorescent print head is used as the standard image resolution.

6. The apparatus of claim 4, wherein when an image resolution of each print head is higher than the standard image resolution, the image data is enlarged in the primary scanning direction so as to enlarge a length of the line images, and when the image resolution of each print head is lower than the standard image resolution, the image data is reduced in the primary scanning direction so as to reduce the length of the line images.

7. The apparatus of claim 6, wherein when the image data is enlarged in the primary scanning direction, a number of the image data to be added is adjusted, and when the image data are reduced in the primary scanning direction, a number of the image data to be eliminated is adjusted.

8. The apparatus of claim 7, wherein positions of the image data to be eliminated are made different for each primary scanning line.

9. The apparatus of claim 6, wherein the arrangement setting data is set so as to one of: (i) enlarge a ratio of the length of the line images to a number of the image data when the image data is corrected so as to enlarge the length of the line images in the primary direction, and (ii) reduce the ratio when the image data is corrected so as to reduce the length of the line images in the primary direction.

10. The apparatus of claim 1, wherein one of the plural print heads is used as a reference print head, and the arrangement setting data of another one of the plural print heads is corrected such that an image resolution of another one of the plural print heads is made to conform with an image resolution of the reference print head.

11. The apparatus of claim 10, wherein the plural print heads are adapted to be replaceable.

12. The apparatus of claim 10, wherein all of the plural print heads except the reference print head are adapted to be replaceable.

13. The apparatus of claim 1, wherein the reference component image data is stored in a memory in the apparatus.

14. The apparatus of claim 1, wherein the reference component image forming means is incorporated in a body of the apparatus.

15. The apparatus of claim 1, wherein the plural heads are integrated in a single body.

16. The apparatus of claim 1, wherein the arrangement correcting means corrects the arrangement setting data based on one of the plural print heads for only another one of the plural print heads.

17. The apparatus of claim 1, wherein each print head conducts exposure recording with a different wavelength light.

18. The apparatus of claim 17, wherein the plural print heads comprise print heads for blue light recording, green light recording and red light recording.

19. The apparatus of claim 1, wherein the arrangement setting data includes a first arrangement setting value for adjusting a recording deviation between respective ones of the print heads, and a second arrangement setting value for adjusting a recording position of the color image on the recording medium, and wherein the arrangement correcting means corrects the first arrangement setting value and the second arrangement setting value based on the plural superimposed reference component images.

20. An apparatus for recording a color image on a recording medium by relatively scanning the recording medium in a primary scanning direction and in a secondary scanning direction substantially perpendicular to the primary scanning direction, said apparatus comprising:

plural print heads arranged in parallel to each other in the secondary scanning direction, each said print head comprising a plurality of recording elements aligned along at least a single line in the primary scanning direction;

conveying means for conveying the recording medium relatively to the plural print heads in the secondary scanning direction;

control means for controlling each of the plural print heads to record a line image in the primary scanning direction on the recording medium so as to form plural component line images of the color image while the recording medium is conveyed in the secondary scanning direction, and for controlling image forming timing for each print head based on a timing setting value of each print head so as to superimpose the plural component line images on the conveyed recording medium;

reference component image forming means for controlling the plural print heads to form and superimpose plural reference component images on the conveyed recording medium based on reference component image data and the timing setting value of each print head;

timing correcting means for analyzing Positional deviations in the secondary scanning direction among the plural superimposed reference component images, and correcting the timing setting value of each print head based on the positional deviations in the secondary scanning direction; and a recording medium holding section which holds the recording medium during recording, and wherein the plural print heads and the recording medium holding section are arranged so as to be relatively shiftable in a direction different from the secondary scanning direction.

21. An apparatus for recording a color image on a recording medium by relatively scanning the recording medium in a primary scanning direction and in a secondary scanning direction substantially perpendicular to the primary scanning direction, said apparatus comprising:

plural print heads arranged in parallel to each other in the secondary scanning direction, each said print head comprising a plurality of recording elements aligned along at least a single line in the primary scanning direction;

conveying means for conveying the recording medium relatively to the plural print heads in the secondary scanning direction;

control means for controlling each of the plural print heads to record a line image in the primary scanning direction on the recording medium so as to form plural component line images of the color image while the recording medium is conveyed in the secondary scanning direction, and for controlling image forming timing for each print head based on a timing setting value of each print head so as to superimpose the plural component line images on the conveyed recording medium;

reference component image forming means for controlling the plural print heads to form and superimpose plural reference component images on the conveyed recording medium based on reference component image data and the timing setting value of each print head; and timing correcting means for analyzing positional deviations in the secondary scanning direction among the plural superimposed reference component images, and correcting the timing setting value of each print head based on the positional deviations in the secondary scanning direction; and wherein the timing setting value of each print head includes a first timing setting value for adjusting a recording deviation between each print head and another print head, and a second timing setting value for adjusting a recording position of the color image on the recording medium, and wherein the timing correcting means corrects the first timing setting value and the second timing setting value based on the plural superimposed reference component images.

22. The apparatus of claim 21, wherein the plurality of recording elements of each print head are divided into plural blocks and the timing setting value of each print head is determined with respect to each bock of each print head.

23. The apparatus of claim 21, wherein the timing setting value of each print head is determined with respect to each recording element of each print head.

* * * * *